(12) United States Patent
Funk et al.

(10) Patent No.: US 12,434,036 B2
(45) Date of Patent: Oct. 7, 2025

(54) MEDICAL SYSTEM INCLUDING STEERABLE CATHETER

(71) Applicant: KARDIUM INC., Burnaby (CA)

(72) Inventors: John Andrew Funk, Delta (CA); Ashkan Sardari, North Vancouver (CA)

(73) Assignee: KARDIUM INC., Burnaby (CA)

( * ) Notice: Subject to any disclaimer, the term of this patent is extended or adjusted under 35 U.S.C. 154(b) by 609 days.

(21) Appl. No.: 17/947,340

(22) Filed: Sep. 19, 2022

(65) Prior Publication Data

US 2023/0020466 A1   Jan. 19, 2023

Related U.S. Application Data

(63) Continuation of application No. PCT/CA2021/050496, filed on Apr. 13, 2021.

(60) Provisional application No. 63/015,909, filed on Apr. 27, 2020.

(51) Int. Cl.
*A61M 25/01* (2006.01)

(52) U.S. Cl.
CPC .............................. *A61M 25/0147* (2013.01)

(58) Field of Classification Search
CPC .......... A61M 25/0144; A61M 25/0147; A61M 25/005; A61M 25/0136; A61M 2025/015
USPC ....................................................... 604/95.04
See application file for complete search history.

(56) References Cited

U.S. PATENT DOCUMENTS

| | | | |
|---|---|---|---|
| 5,019,057 A | 5/1991 | Truckai | |
| 5,715,817 A | 2/1998 | Stevens-Wright et al. | |
| 5,782,811 A | 7/1998 | Samson et al. | |
| 6,450,948 B1 | 9/2002 | Matsuura et al. | |
| 6,709,429 B1 | 3/2004 | Schaefer et al. | |
| 6,890,329 B2 * | 5/2005 | Carroll | A61M 25/0144 604/528 |
| 8,444,637 B2 * | 5/2013 | Podmore | A61B 17/00234 604/95.04 |
| 2002/0161353 A1 | 10/2002 | Kortelling | |
| 2003/0009184 A1 | 1/2003 | Pepin | |
| 2009/0043299 A1 | 2/2009 | Racz | |
| 2013/0046298 A1 * | 2/2013 | Kaufman | A61M 25/0144 606/1 |

(Continued)

FOREIGN PATENT DOCUMENTS

| | | |
|---|---|---|
| AU | 2016253129 A1 | 10/2017 |
| WO | 0013733 A2 | 3/2000 |

(Continued)

OTHER PUBLICATIONS

International Search Report issued in International Application No. PCT/CA2021/050495 mailed Jul. 21, 2021.

(Continued)

*Primary Examiner* — Phillip A Gray

(74) *Attorney, Agent, or Firm* — ROSSI, KIMMS & McDOWELL LLP

(57) ABSTRACT

Steerable catheters are provided, some of which include an axial member incorporated in an elongate shaft member, where, in some instances, different edge portions of the axial member exhibit different radii of curvature. In some instances, a furthest-apart pair of points on an external boundary of a cross-section of the axial member is closer to an interior edge than an exterior edge of a tubular member of the elongate shaft member.

30 Claims, 15 Drawing Sheets

(56) References Cited

U.S. PATENT DOCUMENTS

| | | |
|---|---|---|
| 2016/0228136 A1 | 8/2016 | Schaeffer |
| 2019/0231466 A1 | 8/2019 | Weitzner et al. |
| 2020/0275983 A1 | 9/2020 | Dewaele et al. |

FOREIGN PATENT DOCUMENTS

| | | |
|---|---|---|
| WO | 2013016722 A2 | 1/2013 |
| WO | 2016172706 A1 | 10/2016 |
| WO | 2021217242 A1 | 11/2021 |

OTHER PUBLICATIONS

Written Opinion issued in International Application No. PCT/CA2021/050495 mailed Jul. 21, 2021.
International Search Report issued in International Application No. PCT/CA2021/050496 mailed Jul. 14, 2021.
Written Opinion issued in International Application No. PCT/CA2021/050496 mailed Jul. 14, 2021.
Extended European Search Report issued in European Appln. No. 21796280.2, mailed Apr. 26, 2024.

\* cited by examiner

MEDICAL SYSTEM INCLUDING STEERABLE CATHETER

CROSS-REFERENCE TO RELATED APPLICATION

This application is a bypass continuation of prior Patent Cooperation Treaty International Application No. PCT/CA2021/050496, filed Apr. 13, 2021, which claims the benefit of U.S. Provisional Application No. 63/015,909, filed Apr. 27, 2020, the entire disclosure of each of the applications cited in this section is hereby incorporated herein by reference.

TECHNICAL FIELD

Aspects of this disclosure generally are related to medical systems. In particular, aspects of this disclosure relate to medical systems that include a steerable shaft member that may be deployed through a bodily opening leading to a bodily cavity.

BACKGROUND

Cardiac surgery was initially undertaken using highly invasive open procedures. A sternotomy, which is a type of incision in the center of the chest that separates the sternum, was typically employed to allow access to the heart. In the past several decades, however, more and more cardiac operations are performed using intravascular or percutaneous techniques, where access to inner organs or other tissue is gained via a catheter.

Intravascular or percutaneous surgeries benefit patients by reducing surgery risk, complications, and recovery time. However, the use of intravascular or percutaneous technologies also raises some particular challenges. Medical devices used in intravascular or percutaneous surgery need to be deployed via catheter systems which significantly increase the complexity of the device structure. As well, doctors do not have direct visual contact with the medical devices once the devices are positioned within the body.

The positioning of a medical device is crucial to such procedures. For accurate positioning, a catheter needs to be bent or steered as it is deployed through a bodily opening (e.g., an artery) and into a bodily cavity (e.g., an atrium in a heart). By way of the steering, an end of a catheter can be deflected or bent in one or another direction. The steering function can be controlled via the use of one or more axial members (e.g., steering members including various wires, lines, or cables) positioned within the catheter (e.g., within a wall of the catheter). The degree and order of pulling, tensioning, or taking up and playing out the steering members control the degree of deflection of the catheter.

Conventional steerable catheters, however, have certain shortcomings. For example, it is often desired to bend or deflect a steerable portion of the catheter in a pre-determined plane, when one or more axial steering members of the catheter are retracted or advanced. High forces applied by the axial steering members can cause the steerable portion of the catheter to be deflected laterally from the pre-determined plane in an undesired manner. The high forces applied by the axial steering members may also cause other problems. For example, the present inventors recognized that compressive loading provided by the axial steering members can cause the elongated catheter to shorten, thereby providing a user a false indication of where the distal end of the catheter may be during the steering or deflecting thereof. The present inventors also recognized that such conventional steerable catheter devices are limited in the amount and manner that they can be deflected or bent. The present inventors recognized that such limitations may make it difficult or impossible to position a medical device as desired within a bodily cavity. The present inventors also recognized that any solutions configured to address these limitations must not unduly increase various dimensions of the catheter in a manner that would hinder, limit, or restrict delivery of the catheter within the body of the patient. Further, the present inventors recognized that any solutions configured to address these limitations must remain safe for the patient and properly protect against failure conditions of the catheter. Accordingly, a need in the art exists for improved intra-bodily cavity medical devices.

SUMMARY

At least the above-discussed need is addressed and technical solutions are achieved by various embodiments of the present invention. According to some embodiments, a steerable catheter may be summarized as including an elongate shaft member including a proximal portion, a distal portion, and a steerable portion between the proximal portion and the distal portion, the elongate shaft member configured to be deliverable at least partially through a bodily opening leading to a bodily cavity with the distal portion ahead of the proximal portion. In various embodiments, the steerable catheter may include an actuator located at least proximate the proximal portion, the actuator operatively coupled to the steerable portion to transmit force thereto to steer at least the steerable portion. In various embodiments, the steerable catheter may include an axial member incorporated in the elongate shaft member and extending along a length of the elongate shaft member, the axial member including an axis extending between the proximal portion of the elongate shaft member and the distal portion of the elongate shaft member. According to some embodiments, at a particular location along the axis of the axial member, a cross-section of the axial member includes a first edge portion and a second edge portion located on an opposite side of the cross-section of the axial member from the first edge portion, the first edge portion and the second edge portion defining an external boundary of the cross-section of the axial member, the cross-section of the axial member perpendicular to the axis of the axial member. According to various embodiments, a particular part of the first edge portion exhibits a first radius of curvature at a particular point on the first edge portion, and a particular part of the second edge portion exhibits a second radius of curvature at a particular point on the second edge portion. According to various embodiments, the second radius of curvature may have a magnitude that is greater than a magnitude of the first radius of curvature. According to various embodiments, the particular part of the first edge portion may be located further from an interior-most location within the elongate shaft member in a plane of the cross-section of the axial member than the particular part of the second edge portion.

In some embodiments, each of the particular point on the first edge portion and the particular point on the second edge portion may be located on an axis extending radially from the interior-most location within the elongate shaft member in the plane of the cross-section of the axial member.

In some embodiments, each of the first edge portion and the second edge portion may extend to a particular pair of points on the external boundary of the cross-section of the axial member intersected by a major axis of the cross-section of the axial member, the major axis oriented with respect to the cross-section of the axial member such that a distance along the major axis between the particular pair of points on the external boundary of the cross-section of the axial member has a maximum magnitude among all straight-line distances between all combinations of pairs of points along the external boundary of the cross-section of the axial member. In some embodiments, the cross-section of the axial member may include a minor axis intersecting the major axis at a particular location on the major axis, the minor axis being perpendicular to the major axis. According to some embodiments, the first edge portion may be intersected by the minor axis at the particular point on the first edge portion, and the second edge portion may be intersected by the minor axis at the particular point on the second edge portion. In some embodiments, the particular location on the major axis may be halfway between the particular pair of points on the external boundary of the cross-section of the axial member. In some embodiments, the first edge portion of the cross-section of the axial member may be symmetrical about the minor axis of the cross-section of the axial member. In some embodiments, the second edge portion of the cross-section of the axial member may be symmetrical about the minor axis of the cross-section of the axial member. In some embodiments, a first distance between the particular location on the major axis and the particular point on the first edge portion of the cross-section of the axial member may be different than a second distance between the particular location on the major axis and the particular point on the second edge portion of the cross-section of the axial member. In some embodiments, the first distance may be greater than the second distance.

In some embodiments, each of the first edge portion and the second edge portion extends to a particular pair of points on the external boundary of the cross-section of the axial member intersected by a major axis of the cross-section of the axial member, the major axis oriented with respect to the cross-section of the axial member such that a distance along the major axis between the particular pair of points on the external boundary of the cross-section of the axial member has a maximum magnitude among all straight-line distances between all combinations of pairs of points along the external boundary of the cross-section of the axial member. In some embodiments, (a) the first edge portion of the cross-section of the axial member may extend along an arcuate path from one point of the particular pair of points on the external boundary of the cross-section of the axial member to the other point of the particular pair of points on the external boundary of the cross-section of the axial member, (b) the second edge portion of the cross-section of the axial member may extend along an arcuate path from the one point of the particular pair of points on the external boundary of the cross-section of the axial member to the other point of the particular pair of points on the external boundary of the cross-section of the axial member, or both (a) and (b). In some embodiments, a first distance extending along the first edge portion of the cross-section of the axial member from one point of the particular pair of points on the external boundary of the cross-section of the axial member to the other point of the particular pair of points on the external boundary of the cross-section of the axial member may be different than a second distance extending along the second edge portion of the cross-section of the axial member from the one point of the particular pair of points on the external boundary of the cross-section of the axial member to the other point of the particular pair of points on the external boundary of the cross-section of the axial member.

In some embodiments, the major axis does not intersect the external boundary of the cross-section of the axial member at any location on the external boundary other than at each point of the particular pair of points on the external boundary of the cross-section of the axial member. In some embodiments, the major axis may intersect the external boundary of the cross-section of the axial member at one or more locations on the external boundary in addition to each point of the particular pair of points on the external boundary of the cross-section of the axial member.

According to some embodiments, the particular part of the first edge portion may be located further from the interior-most location within the elongate shaft member in the plane of the cross-section of the axial member than all of the second edge portion. In some embodiments, the magnitude of the second radius of curvature is a maximum as compared to a respective magnitude of each radius of curvature of every other part of the second edge portion. In some embodiments, the magnitude of the first radius of curvature is a maximum as compared to a respective magnitude of each radius of curvature of every other part of the first edge portion. In some embodiments, the magnitude of the second radius of curvature is a maximum as compared to a respective magnitude of each radius of curvature of every part of the first edge portion.

In some embodiments, the particular part of the second edge portion may be a particular arcuate part of the second edge portion, and the particular part of the first edge portion may be a particular arcuate part of the first edge portion. In some embodiments, each of the particular part of the first edge portion and the particular part of the second edge portion may be concave toward the interior-most location within the elongate shaft member in the plane of the cross-section of the axial member. In some embodiments, the particular location on the first edge portion and the particular location on the second edge portion may be located on a same side of the major axis in the plane of the cross-section of the axial member. In some embodiments, the particular location on the first edge portion and the particular location on the second edge portion may be located on opposite sides of the major axis in the plane of the cross-section of the axial member.

Various steerable catheters in other embodiments may include combinations or sub-combinations of features described above. According to some embodiments, a steerable catheter may be summarized as including an elongate shaft member including a proximal portion, a distal portion, and a steerable portion located between the proximal portion and the distal portion, the elongate shaft member configured to be deliverable at least partially through a bodily opening leading to a bodily cavity with the distal portion ahead of the proximal portion. In some embodiments, the steerable catheter may include an actuator located at least proximate the proximal portion, the actuator operatively coupled to the steerable portion to transmit force thereto to steer at least the steerable portion. In some embodiments, the steerable catheter may include an axial member incorporated into the elongate shaft member and extending along a length of the elongate shaft member, the axial member including an axis extending between the proximal portion of the elongate shaft member and the distal portion of the elongate shaft member. According to some embodiments, at a particular location along the axis of the axial member, a cross-section of the axial member includes a first edge portion and a second edge portion located on an opposite side of the cross-section of the axial member from the first edge portion, the first edge portion and the second edge portion defining an external boundary of the cross-section of the axial member, the cross-section of the axial member perpendicular to the axis of the axial member. In some embodiments, each of the first edge portion of the cross-section of the axial member and the second edge portion of the cross-section of the axial member may extend to a particular pair of points on the external boundary of the cross-section of the axial member intersected by a major axis of the cross-section of the axial member, the major axis oriented with respect to the cross-section of the axial member such that a distance along the major axis between the particular pair of points on the external boundary of the cross-section of the axial member has a maximum magnitude among all straight-line distances between all combinations of pairs of points along the external boundary of the cross-section of the axial member. In some embodiments, the cross-section of the axial member may include a minor axis intersecting the major axis at a particular location on the major axis, the minor axis perpendicular to the major axis. In some embodiments, the first edge portion is intersected by the minor axis at a particular point on the first edge portion, and a particular arcuate part of the first edge portion at the particular point on the first edge portion has a center of curvature located at a first particular location. In some embodiments, the second edge portion is intersected by the minor axis at a particular point on the second edge portion, and a particular arcuate part of the second edge portion at the particular point on the second edge portion has a center of curvature located at a second particular location. According to some embodiments, the second particular location is spaced from the first particular location.

In some embodiments, the particular arcuate part of the first edge portion may be located further from an interior-most location within the elongate shaft member in a plane of the cross-section of the axial member than the particular arcuate part of the second edge portion. In some embodiments, each of the first particular location and the second particular location may be located on a same side of the particular arcuate part of the second edge portion in the plane of the cross-section of the axial member. In some embodiments, each of the first particular location and the second particular location may be located on a same side of the major axis in the plane of the cross-section of the axial member. In some embodiments, (a) the first particular location, (b) the second particular location, or each of (a) and (b) may be located on the minor axis. In some embodiments, (a) the first particular location and the particular point on the first edge portion may be intersected by a first axis, and (b) the second particular location and the particular point on the second edge portion may be intersected by a second axis which is not parallel to the first axis.

In some embodiments, (a) the first particular location and the particular point on the first edge portion may be intersected by a first axis, and (b) the second particular location and the particular point on the second edge portion may be intersected by a second axis parallel to the first axis. In some embodiments, each of the first axis and the second axis may be parallel to the minor axis. In some embodiments, each of the first axis and the second axis may not be parallel to the minor axis.

In some embodiments, (a) the first edge portion of the cross-section of the axial member may be symmetrical about the minor axis, (b) the second edge portion of the cross-section of the axial member may be symmetrical about the minor axis, or both (a) and (b). In some embodiments, the major axis does not intersect the external boundary of the cross-section of the axial member at any location on the external boundary other than at each point of the particular pair of points on the external boundary of the cross-section of the axial member. In some embodiments, the major axis may intersect the external boundary of the cross-section of the axial member at one or more locations on the external boundary in addition to each point of the particular pair of points on the external boundary of the cross-section of the axial member.

In some embodiments, a first distance extending along the first edge portion of the cross-section of the axial member from one point of the particular pair of points on the external boundary of the cross-section of the axial member to the other point of the particular pair of points on the external boundary of the cross-section of the axial member may be different than a second distance extending along the second edge portion of the cross-section of the axial member from the one point of the particular pair of points on the external boundary of the cross-section of the axial member to the other point of the particular pair of points on the external boundary of the cross-section of the axial member. In some embodiments, the particular point on the first edge portion may be located further from an interior-most location within the elongate shaft member in the plane of the cross-section of the axial member than the particular point on the second edge portion. In some embodiments, the first distance may be greater than the second distance.

In some embodiments, a first distance between the particular location on the major axis and the particular point on the first edge portion of the cross-section of the axial member may be different than a second distance between the particular location on the major axis and the particular point on the second edge portion of the cross-section of the axial member. In some embodiments, the first distance may be greater than the second distance. In some embodiments, the particular location on the major axis may be located halfway between the particular pair of points on the external boundary of the cross-section of the axial member.

Various steerable catheters in other embodiments may include combinations or sub-combinations of features described above. According to various embodiments, a steerable catheter may be summarized as including an elongate shaft member including a proximal portion, a distal portion, and a steerable portion located between the proximal portion and the distal portion, the elongate shaft member configured to be deliverable at least partially through a bodily opening leading to a bodily cavity with the distal portion ahead of the proximal portion. In some embodiments, the steerable catheter may include an actuator located at least proximate the proximal portion, the actuator operatively coupled to the steerable portion to transmit force thereto to steer at least the steerable portion. In some embodiments, the steerable catheter may include an axial member incorporated into a wall of a tubular layer of the elongate shaft member extending along a length of the elongate shaft member, the axial member including an axis extending between the proximal portion of the elongate shaft member and the distal portion of the elongate shaft member, the tubular layer forming a closed shape in a plane of a cross-section of the axial member, the cross-section of the axial member perpendicular to the axis of the axial member. In some embodiments, at a particular location along the axis of the axial member, the cross-section of the axial member includes a first edge portion and a second edge portion located on an opposite side of the cross-section of the axial member from the first edge portion, the first edge portion and the second edge portion defining an external boundary of the cross-section of the axial member. In some embodiments, each of the first edge portion of the cross-section of the axial member and the second edge portion of the cross-section of the axial member may be distanced from an external edge of the closed shape of the tubular layer in the plane of the cross-section of the axial member. In some embodiments, each of the first edge portion of the cross-section of the axial member and the second edge portion of the cross-section of the axial member may be distanced from an interior edge of the closed shape of the tubular layer in the plane of the cross-section of the axial member. In some embodiments, each of the first edge portion of the cross-section of the axial member and the second edge portion of the cross-section of the axial member may extend to a particular pair of points on the external boundary of the cross-section of the axial member intersected by a major axis of the cross-section of the axial member, the major axis oriented with respect to the cross-section of the axial member such that a distance along the major axis between the particular pair of points on the external boundary of the cross-section of the axial member has a maximum magnitude among all straight-line distances between all combinations of pairs of points along the external boundary of the cross-section of the axial member. In some embodiments, each point of the particular pair of points on the external boundary of the cross-section of the axial member may be closer to the interior edge of the closed shape of the tubular layer than to the external edge of the closed shape of the tubular layer in the plane of the cross-section of the axial member.

In some embodiments, the tubular layer surrounds a lumen provided in the elongate shaft member, and each point of the particular pair of points on the external boundary of the cross-section of the axial member may be closer to an edge of a closed shape of the lumen in the plane of the cross-section of the axial member than to an edge of an exterior surface of the elongate shaft member in the plane of the cross-section of the axial member. In some embodiments, the interior edge of the closed shape of the tubular layer in the plane of the cross-section of the axial member defines an edge of a closed shape of a lumen within the plane of the cross-section of the axial member. In some embodiments, the tubular layer may be a first tubular layer, and the elongate shaft member may include a second tubular layer coaxially arranged with the first tubular layer, the second tubular layer positioned outwardly from the first tubular layer. In some embodiments, the tubular layer may be a first tubular layer, and the elongate shaft member may include a second tubular layer coaxially arranged with the first tubular layer, the second tubular layer positioned inwardly from the first tubular layer.

In some embodiments, the external edge of the closed shape of the tubular layer may be distanced from an edge of an exterior surface of the elongate shaft member in the plane of the cross-section of the axial member. In some embodiments, the external edge of the closed shape of the tubular layer may be provided at least in part by an edge of an exterior surface of the elongate shaft member in the plane of the cross-section of the axial member.

In some embodiments, the first edge portion of the cross-section of the axial member may extend along an arcuate path from one point of the particular pair of points on the external boundary of the cross-section of the axial member to the other point of the particular pair of points on the external boundary of the cross-section of the axial member. In some embodiments, the second edge portion of the cross-section of the axial member may extend along an arcuate path from one point of the particular pair of points on the external boundary of the cross-section of the axial member to the other point of the particular pair of points on the external boundary of the cross-section of the axial member.

In some embodiments, (a) the first edge portion of the cross-section of the axial member, (b) the second edge portion of the cross-section of the axial member, or each of (a) and (b) may be symmetrical about a minor axis of the cross-section of the axial member, the minor axis perpendicular to the major axis. In some embodiments, the major axis does not intersect the external boundary of the cross-section of the axial member at any location on the external boundary other than at each point of the particular pair of points on the external boundary of the cross-section of the axial member. In some embodiments, the major axis may intersect the external boundary of the cross-section of the axial member at one or more locations on the external boundary in addition to each point of the particular pair of points on the external boundary of the cross-section of the axial member.

In some embodiments, a first distance extending along the first edge portion of the cross-section of the axial member from one point of the particular pair of points on the external boundary of the cross-section of the axial member to the other point of the particular pair of points on the external boundary of the cross-section of the axial member may be different than a second distance extending along the second edge portion of the cross-section of the axial member from the one point of the particular pair of points on the external boundary of the cross-section of the axial member to the other point of the particular pair of points on the external boundary of the cross-section of the axial member. In some embodiments, the first distance may be greater than the second distance, and at least part of the first edge portion of the cross-section of the axial member may be located further from an interior-most location within the elongate shaft member in the plane of the cross-section of the axial member than each part of the second edge portion of the cross-section of the axial member.

In some embodiments, the cross-section of the axial member includes a minor axis perpendicular to the major axis, the minor axis intersecting the major axis at a particular location on the major axis located halfway between the particular pair of points on the external boundary of the cross-section of the axial member. In some embodiments, a first distance between the particular location on the major axis and a first location on the minor axis intersected by the first edge portion of the cross-section of the axial member may be different than a second distance between the particular location on the major axis and a second location on the minor axis intersected by the second edge portion of the cross-section of the axial member.

Various steerable catheters in other embodiments may include combinations or sub-combinations of features described above. In any of the embodiments described above, the elongate shaft member may include a central longitudinal axis, and the interior-most location within the elongate shaft member in the plane of the cross-section of the axial member may be a location in the plane of the cross-section of the axial member intersected by the central longitudinal axis. In any of the embodiments described above, the interior-most location within the elongate shaft member in the plane of the cross-section of the axial member may be a centroid of a cross-section of the elongate shaft member in the plane of the cross-section of the axial member.

In any of the embodiments described above, the axial member may be incorporated into a wall of a tubular member of the elongate shaft member, the tubular member forming a closed shape in a plane of a cross-section of the axial member, and each of the first edge portion of the cross-section of the axial member and the second edge portion of the cross-section of the axial member may be distanced, in the plane of the cross-section of the axial member, from each of (a) an external edge of the closed shape of the tubular member, and (b) an interior edge of the closed shape of the tubular member. In any of the embodiments described above, the external edge of the closed shape of the tubular member may be distanced from an exterior surface of the elongate shaft member in the plane of the cross-section of the axial member. In any of the embodiments described above, the external edge of the closed shape of the tubular member may be provided at least in part by an exterior surface of the elongate shaft member.

In any of the embodiments described above, the axial member may be embedded in the elongate shaft member to resist axial movement thereof.

In any of the embodiments described above, the actuator may be operatively coupled to the steerable portion to cause deflection of the at least the steerable portion in a first particular plane, and the axial member may be configured at least to resist, at least in part, lateral deflection of the at least the steerable portion away from the first particular plane during the deflection of the at least the steerable portion in the first particular plane. In any of the embodiments described above, the axial member may be a first axial member, and the steerable catheter may include a second axial member incorporated into the elongate shaft member and extending along the length of the elongate shaft member, the second axial member including an axis extending between the proximal portion of the elongate shaft member and the distal portion of the elongate shaft member. In any of the embodiments described above, the second axial member may be configured at least to resist, at least in part, the lateral deflection of the at least the steerable portion away from the first particular plane during the deflection of the at least the steerable portion in the first particular plane. In any of the embodiments described above, the axis of the first axial member and the axis of the second axial member may lie in a second particular plane, the second particular plane intersecting the first particular plane. In any of the embodiments described above, the second particular plane may be orthogonal to the first particular plane. In any of the embodiments described above, the steerable catheter may include a first steering member and a second steering member, and the actuator may be configured to manipulate the first steering member, the second steering member, or both the first steering member and the second steering member, to cause deflection of the at least the steerable portion in the first particular plane. In any of the embodiments described above, the elongate shaft member may include a reinforcement structure, at least a first portion of the reinforcement structure surrounding at least a respective portion of each of the first axial member and the second axial member. In any of the embodiments described above, at least a second portion of the reinforcement structure may surround at least a respective portion of each of the first steering member and the second steering member. In any of the embodiments described above, the reinforcement structure may include a helical structure. In any of the embodiments described above, the reinforcement structure may include a braided structure. In any of the embodiments described above, at least the first axial member may be woven among braids of the braided structure. In any of the embodiments described above, at least the first steering member may be woven among braids of the braided structure.

In any of the embodiments described above, at least a portion of the axial member may be positioned in a lumen provided in the elongate shaft member, the axial member operatively coupled to the elongate shaft member such that relative translation between the lumen and the at least the portion of the axial member provided in the lumen occurs during the steering of the at least the steerable portion.

In any of the embodiments described above, the axial member may be a steering member operatively coupling the steerable portion to the actuator, the actuator configured to manipulate the steering member to cause deflection of at least the steerable portion in a particular plane.

Various steerable catheters in other embodiments may include combinations or sub-combinations of features described above. Various embodiments of the present invention may include systems, devices, or machines that are or include combinations or subsets of any one or more of the systems, devices, or machines and associated features thereof summarized above or otherwise described herein.

Further, all or part of any one or more of the systems, devices, or machines summarized above or otherwise described herein or combinations or sub-combinations thereof may implement or execute all or part of any one or more of the processes or methods described herein or combinations or sub-combinations thereof.

BRIEF DESCRIPTION OF THE DRAWINGS

It is to be understood that the attached drawings are for purposes of illustrating aspects of various embodiments and may include elements that are not to scale.

FIG. 5F-1 is a partial cross-sectional view of an elongate shaft member of a medical system, the elongate shaft member including a reinforcement structure, according to some embodiments.

FIG. 5F-2 is a side view of the elongate shaft member of FIG. 5F-1, with at least an outer layer of the elongate shaft member removed to more clearly see aspects of the reinforcement structure, according to some embodiments.

DETAILED DESCRIPTION

Figure 1:
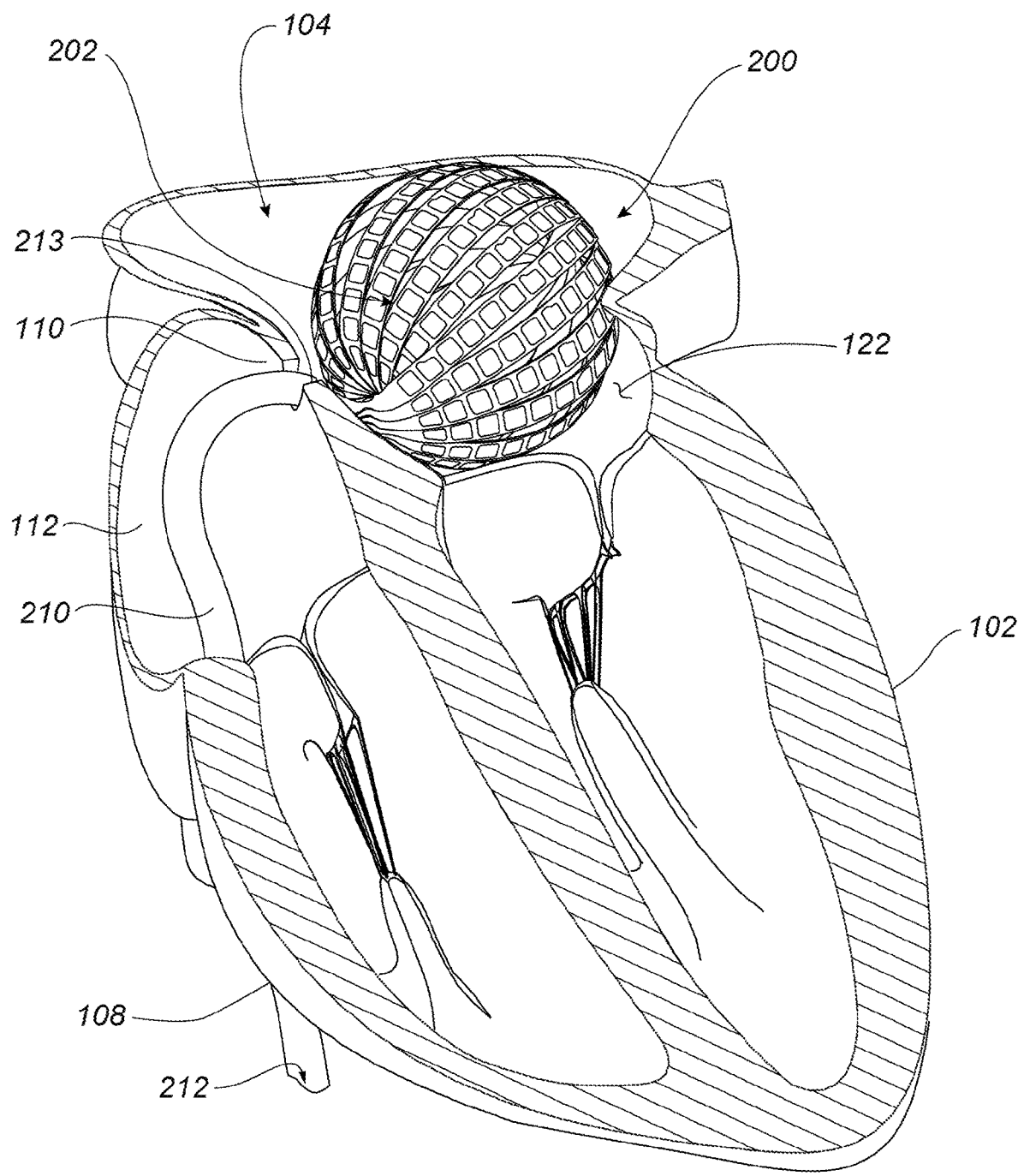
FIG. 1 is a cutaway diagram of a heart showing a medical system including an elongate shaft member coupled to an expandable structure percutaneously placed in a left atrium of the heart, according to various example embodiments.

Various embodiments disclosed herein provide improved medical device systems that include various axial members within an elongate shaft member of a medical device (e.g., a steerable catheter). At least some of these and other embodiments allow, e.g., the steerable catheter to exhibit improved bendability and positioning with respect to particular anatomical features that improves desired placement of an operative structure delivered by the elongate shaft member within a bodily cavity to treat the bodily cavity. At least some of these and other embodiments allow, e.g., the catheter to retain a desired diameter of the elongate shaft member that is suitable at least for percutaneous delivery, while maintaining safety of operation. It should be noted that the invention is not limited to these or any other examples provided herein, which are referred to for purposes of illustration only.

In the following description, certain specific details are set forth in order to provide a thorough understanding of various embodiments of the invention. However, one skilled in the art will understand that the invention may be practiced at a more general level without one or more of these details. In other instances, well-known structures (e.g., structures associated with medical systems and catheters) have not been shown or described in detail to avoid unnecessarily obscuring descriptions of various embodiments of the invention.

Any reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, any appearance of the phrase "in one embodiment" or "in an embodiment" or "in an example embodiment" or "in this illustrated embodiment" or "in this particular embodiment" or the like in this specification is not necessarily referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase 'based at least on A' includes A as well as the possibility of one or more other additional elements besides A. In the same manner, the phrase 'based on A' includes A, as well as the possibility of one or more other additional elements besides A. However, the phrase 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase 'configured only to A' means a configuration to perform only A.

The word "device", the word "machine", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified that a device or machine or device system resides entirely within a same housing to exclude embodiments where the respective device, machine, or device system resides across different housings. The word "device" may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

In some embodiments, the term "adjacent", the term "proximate", or the like refers at least to a sufficient closeness between the objects defined as adjacent, proximate, or the like, to allow the objects to interact in a designated way. For example, if object A performs an action on an adjacent or proximate object B, objects A and B would have at least a sufficient closeness to allow object A to perform the action on object B. In this regard, some actions may require contact between the associated objects, such that if object A performs such an action on an adjacent or proximate object B, objects A and B would be in contact, for example, in some instances or embodiments where object A needs to be in contact with object B to successfully perform the action. In some embodiments, the term "adjacent", the term "proximate", or the like additionally or alternatively refers to objects that do not have another substantially similar object between them. For example, object A and object B may be considered adjacent or proximate in some embodiments if they contact each other (and, thus, it may be considered that no other object is between them), or if they do not contact each other but no other object that is substantially similar to object A, object B, or both objects A and B, depending on the embodiment, is between them. In some embodiments, the term "adjacent", the term "proximate", or the like additionally or alternatively refers to at least a sufficient closeness between the objects defined as adjacent, proximate, or the like, the sufficient closeness being within a range that does not place any one or more of the objects into a different or dissimilar region, or does not change an intended function of any one or more of the objects or of an encompassing object that includes a set of the objects. Different embodiments of the present invention adopt different ones or combinations of the above definitions. Of course, however, the term "adjacent", the term "proximate", or the like is not limited to any of the above example definitions, according to some embodiments. In addition, the term "adjacent" and the term "proximate" do not have the same definition, according to some embodiments.

The term "proximal", in the context of a proximal portion, proximal location, and the like of a medical device, includes, for example, the portion, location, and the like, being or being configured to be further away from a patient or portion of or region within a patient (e.g., a bodily cavity) intended to be treated or assessed by the medical device, as compared to a distal portion, location, and the like of the medical device, according to some embodiments. In some embodiments, the term "proximal", in the context of a proximal portion, proximal location, and the like of a medical device, includes, for example, the portion, location, and the like, being or being configured to be delivered (e.g., percutaneously or intravascularly) toward a patient or portion of or region within a patient (e.g., a bodily cavity) intended to be treated or assessed by the medical device, after or behind a distal portion, location, and the like of the medical device. On the other hand, the term "distal", in the context of a distal portion, distal location, and the like of a medical device, includes, for example, the portion, location, and the like, being or being configured to be closer to a patient or portion of or region within a patient (e.g., a bodily cavity) intended to be treated or assessed by the medical device, as compared to a proximal portion, location, and the like of the medical device, according to some embodiments. In some embodiments, the term "distal", in the context of a distal portion, distal location, and the like of a medical device, includes, for example, the portion, location, and the like, being or being configured to be delivered (e.g., percutaneously or intravascularly) toward a patient or portion of or region within a patient (e.g., a bodily cavity) intended to be treated or assessed by the medical device, before or ahead of a proximal portion, location, and the like of the medical device.

The phrase "bodily opening" as used in this disclosure should be understood to include, for example, a naturally occurring bodily opening or channel or lumen; a bodily opening or channel or lumen or perforation formed by an instrument or tool using techniques that can include, but are not limited to, mechanical, thermal, electrical, chemical, and exposure or illumination techniques; a bodily opening or channel or lumen formed by trauma to a body; or various combinations of one or more of the above. Various elements having respective openings, lumens or channels and positioned within the bodily opening (e.g., a catheter sheath or catheter introducer) may be present in various embodiments. These elements may provide a passageway through a bodily opening for various devices employed in various embodiments.

The phrase "bodily cavity" as used in this disclosure should be understood to mean a cavity in a body. The bodily cavity may be a cavity provided in a bodily organ (e.g., an intra-cardiac cavity or chamber of a heart). The bodily cavity may be provided by a bodily vessel.

FIG. 1 is a medical system 200 including an expandable structure 202 percutaneously or intravascularly placed in a left atrium 104 of a heart 102, according to some embodiments. In some embodiments, the medical system 200 may be considered a steerable catheter. Expandable structure 202 can be percutaneously or intravascularly inserted into a portion of the heart 102, such as an intra-cardiac cavity, like left atrium 104. In this example, the expandable structure 202 is physically coupled to an end of an elongate shaft member 210 inserted via the inferior vena cava 108 and penetrating through a bodily opening in transatrial septum 110 from right atrium 112. In other embodiments, other paths may be taken. In some embodiments, the elongate shaft member 210 may be part of a steerable catheter. The elongate shaft member 210 is flexible and appropriately sized to be delivered, at least in part, percutaneously or intravascularly, according to various embodiments. In some embodiments, at least part of the elongate shaft member 210 is delivered though a natural bodily opening. Various portions of elongate shaft member 210 may be steerable, such as in some embodiments in which the medical system 200 is a steerable catheter.

In some embodiments, expandable structure 202 assumes an unexpanded configuration for delivery to left atrium 104. Expandable structure 202 can then be selectively expanded upon delivery to left atrium 104 to position certain portions of the expandable structure 202 proximate the interior surface formed by tissue 122 of left atrium 104 in order to, for example, sense characteristics of, ablate, or otherwise interact with or treat such tissue 122.

Figure 2:
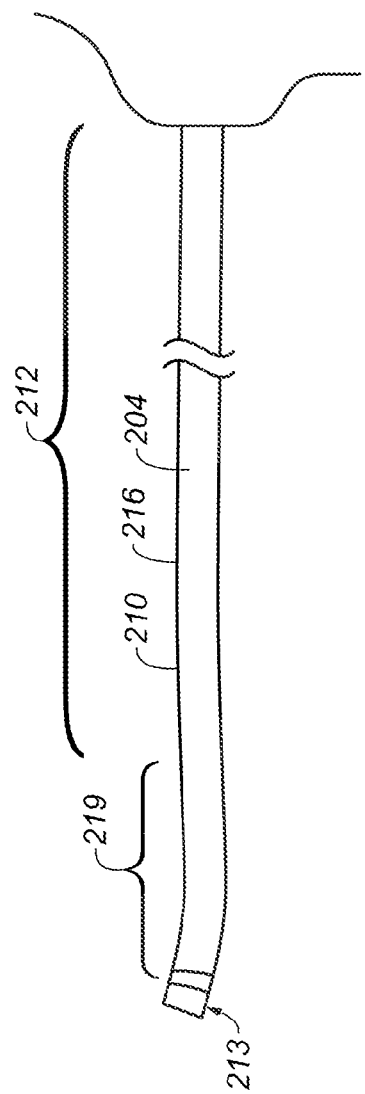
FIG. 2 shows portions of an elongate shaft member of a medical system, such as the medical system shown in FIG. 1, according to example embodiments.

FIG. 2 shows portions of elongate shaft member 210 of a medical system 200, according to example embodiments. In some embodiments, the elongate shaft member 210 may be part of a steerable catheter. In some embodiments, elongate shaft member 210 is elongate and flexible, and includes a circumferential wall 204 (e.g., which may be an outer, exterior, or external wall in some embodiments). Elongate shaft member 210 includes a proximal portion 212 and a distal portion 213, according to some embodiments. In some embodiments, expandable structure 202 (not shown in FIG. 2, but shown at least in FIG. 1) may be physically coupled to the distal portion 213. In various embodiments, the elongate shaft member 210 is arranged to be delivered (e.g., percutaneously, intravascularly, or through a natural bodily opening) to a bodily cavity or organ with the distal portion 213 positioned to be delivered ahead of the proximal portion 212. In some embodiments, the elongate shaft member 210 is configured such that at least a part of the proximal portion 212 is located outside of a body when the distal portion 213 is delivered to a desired destination within the body (e.g., in an organ such as the atrium of a heart). In various embodiments, the elongate shaft member 210 includes a steerable portion 219 between the proximal portion 212 and the distal portion 213. In various embodiments, an actuator or actuator set (e.g., described below with respect to at least actuator device system 240, according to some embodiments) located at least proximate the proximal portion 212 is operatively coupled to the steerable portion 219 to transmit force thereto to steer or deflect at least the steerable portion 219. In some embodiments, the distal portion 213 is also steered or deflected with the steerable portion 219. In some embodiments, the steerable portion 219 includes the distal portion 213. In various embodiments, elongate shaft member 210 includes at least one lumen therein (e.g., extending between the proximal portion 212 and the distal portion 213). In some embodiments, the at least one lumen may include (a) an entry port of a passageway provided in the elongate shaft member 210 and (b) an exit port of the passageway provided in the elongate shaft member 210. In some embodiments, elongate shaft member 210 is a hollow shaft member or a tubular shaft member.

According to various embodiments, the actuator or actuator set (e.g., described below with respect to at least actuator device system 240, according to some embodiments) is operatively coupled to at least the steerable portion 219, e.g., by one or more axial members configured to transmit force to particular parts of the elongate shaft member 210 in some embodiments, to cause deflection of the at least the steerable portion 219 in a first particular plane. In some embodiments, these axial members are also known as steering members. For example, in the partial section view of FIG. 3, a steering member set, including steering member 226 and steering member 228, is coupled to the actuator or actuator set to transmit force to particular parts of the elongate shaft member 210 to cause deflection of the at least the steerable portion 219 in a first particular plane, according to some embodiments. In some embodiments, each of the steering member 226 and the steering member 228 may include a respective steering line or cable disposed within a respective tubular member that is provided within (e.g., within a wall, according to some embodiments, of) the elongate shaft member 210. In some embodiments, each tubular member includes a low friction material (e.g., Polytetrafluoroethylene (PTFE)) to reduce resistance to movements of the steering line through the tubular member.

Figure 3:
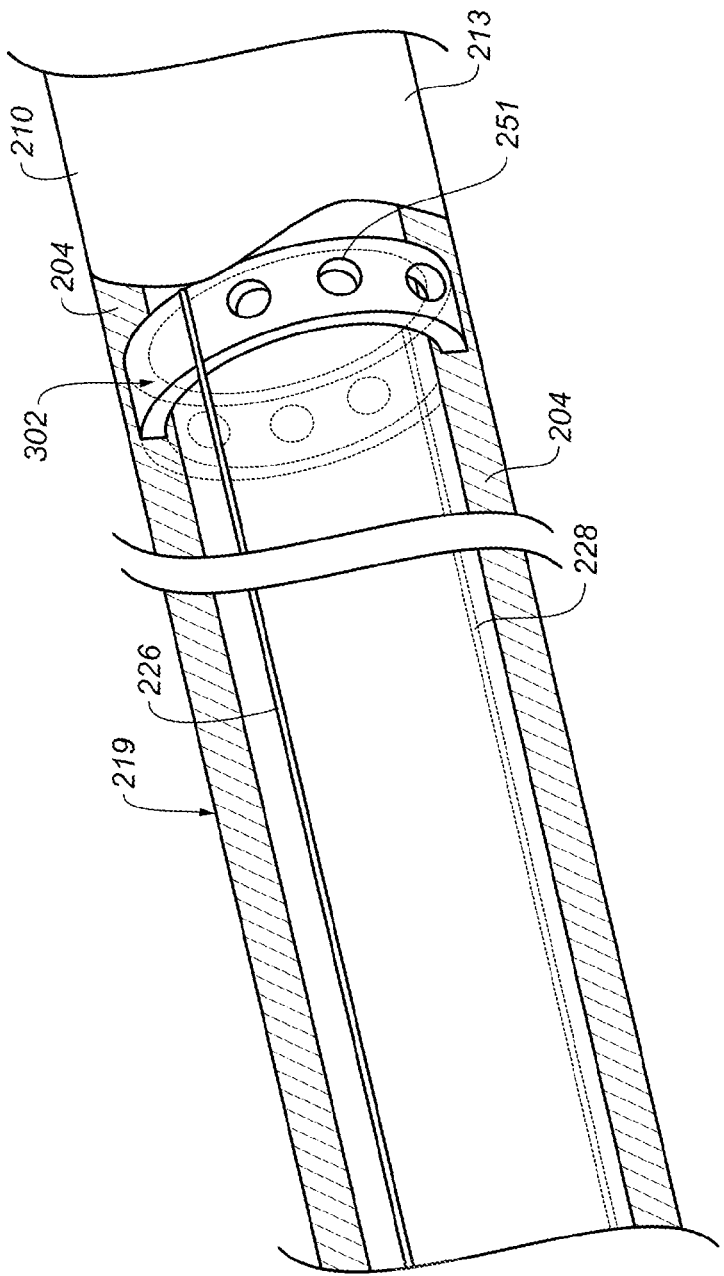
FIG. 3 is a partial section view of an elongate shaft member of a medical system, according to some embodiments.

Each of the steering members (e.g., steering members 226, 228) may have various material compositions, according to various embodiments. For example, in some embodiments, various ones of the steering members (e.g., steering members 226, 228) may be made from various suitable cable materials including various polymers (e.g., various thermoplastics) or metallic materials (e.g., stainless steel). The various steering members (e.g., steering members 226, 228) may be terminated, secured, or otherwise fastened or attached to respective ones of securing portions 214, 215 (shown, e.g., in at least FIGS. 4A, 4B, and 4C, according to some embodiments) of the elongate shaft member 210 by various techniques including the use of mechanical fasteners, knots, bonding employing various adhesives, welding, and combinations thereof. To minimize the overall size requirements of the elongate shaft member 210, techniques that generally produce a lower-profile or smaller securing joint are generally preferred. In various embodiments, the overall cross-sectional size of the elongate shaft member 210 is generally desired to be as small as possible when employed as a catheter required to be delivered through restrictive bodily openings (e.g., various vascular passages). In some embodiments, a steering ring 302 is disposed in (e.g., within or, in some embodiments, inward from an exterior surface of) the elongate shaft member 210, for example, as shown in FIG. 3. In some embodiments, the steering ring 302 is disposed in (e.g., within or, in some embodiments, inward from) the wall 204 of the elongate shaft member 210. Advantageously, in some embodiments, the steering ring 302 is disposed within the wall 204 of the elongate shaft member 210 so as to provide additional structural support to the wall 204 and to allow for a reduced size or dimension (e.g., thickness, diameter or circumference) of elongate shaft member 210, as compared to, for example, some embodiments where the steering ring 302 is disposed radially inward from the wall 204. In some embodiments, the steering ring 302 provides securing portions (e.g., securing portions 214, 215) for the steering members (e.g., steering members 226, 228). In some embodiments, the steering ring 302 is metal (e.g., stainless steel). In some embodiments, the steering ring 302 is arranged or configured to have a closed form (e.g., a closed continuous ring). For example, in some embodiments, steering ring 302 is a continuous closed ring, with notches or slots formed therein along the longitudinal direction of the elongate shaft member 210 that do not entirely sever the steering ring 302, in which at least part of the steering members (e.g., steering members 226, 228) are welded or adhered. In some embodiments, the steering ring 302 includes slots along the longitudinal direction of the elongate shaft member 210 that entirely sever the steering ring, in which at least part of the steering members (e.g., steering members 226, 228) are welded or adhered. In some of these embodiments, the welding or adhering of the steering members (e.g., steering members 226, 228) fills the slots and, therefore, the steering ring 302 may still be considered a continuous closed ring. In some embodiments, the steering ring 302 is arranged or configured to have an open form (e.g., an open ring including one or more complete interruptions that respectively prevent a path that extends around the entirety of the ring). It is noted that an open ring that includes multiple complete interruptions may essentially include a plurality of separate components. These separate components may include one or more spaces therebetween but are considered to still form part of a ring when positioned in a ring-like configuration or constrained by at least part of the elongate shaft member 210 to maintain a ring-like configuration. For example, steering ring 302 may include two spaced apart portions, the two spaced apart portions maintained by the elongate shaft member 210 in a spatial orientation that defines a ring-like shape from the two portions.

In some embodiments, the elongate shaft member 210 is produced, at least in part, by welding the steering members (e.g., steering members 226, 228) to the steering ring 302, as shown, for example, in FIG. 3, and at least part of the wall 204 of the shaft is formed around the steering members (e.g., steering members 226, 228) and the ring 302 by melting a polymer (e.g., polyurethane, polyethylene, PEBA (e.g., PEBAX 3533, 7233), and Nylon 12 (e.g., VESTAMID)), according to some embodiments. PEBAX is a registered Trademark of ARKEMA FRANCE CORPORATION FRANCE 420 Rue d'Estienne d'Orves 92700 Colombes FRANCE. VESTAMID is a registered Trademark of EVONIK DEGUSSA GMBH CORPORATION FED REP GERMANY RELLINGHAUSER STRASSE 1-11 ESSEN FED REP GERMANY 45128. Openings 251 (one called out in FIG. 3) in the steering ring 302 provide regions that may be filled by such polymer during the melting process to facilitate integral formation of the wall 204 and the steering ring 302, according to some embodiments. In some embodiments, the steering ring 302 is disposed at or proximate the steerable portion 219 of the elongate shaft member 210. In some embodiments, the steering ring 302 is disposed between the steerable portion 219 of the elongate shaft member 210 and the distal portion 213 of the elongate shaft member 210. In some embodiments, the steering ring 302 is disposed at or proximate the distal portion 213 of the elongate shaft member 210.

Figure 4A:
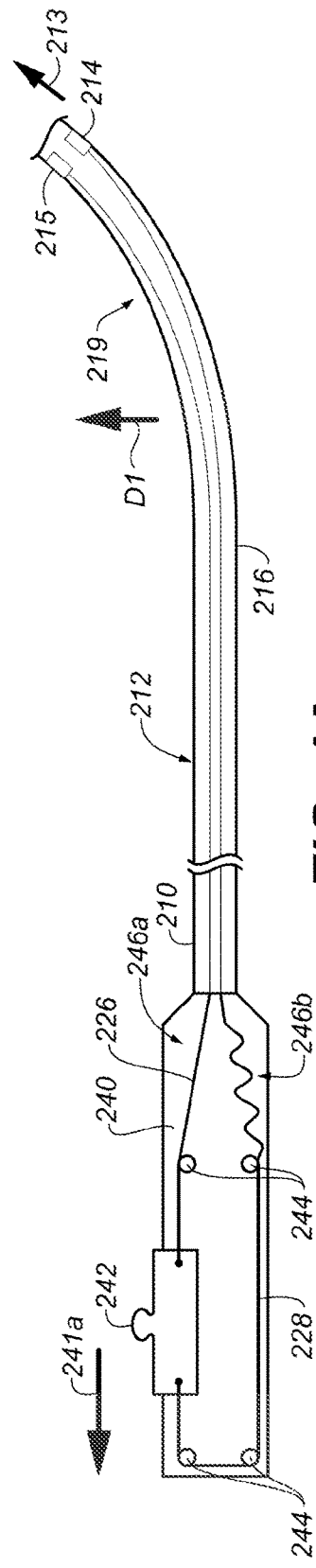
FIGS. 4A, 4B, and 4C show at least part of a medical system including an elongate shaft member in various bending or deflection configurations under control of an actuator device system of the medical system, according to some embodiments.
Figure 4B:
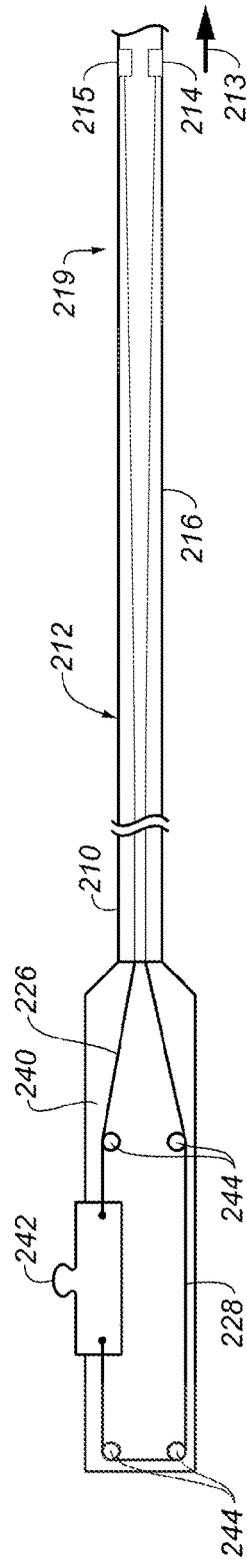
Figure 4C:
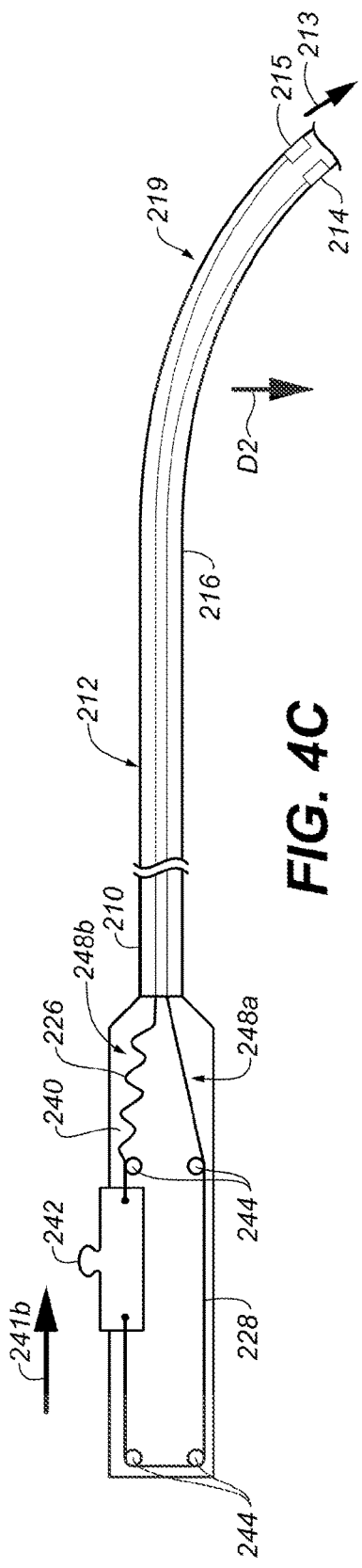

As described, the steering members 226, 228 may be operatively coupled to the steering ring 302 to cause selective bending of steerable portion 219, according to various embodiments. With reference to FIGS. 4A, 4B, and 4C, and with continued reference to FIGS. 2 and 3, there is shown the elongate shaft member 210 in various bending or deflection configurations. Operation of one or more of the steering members 226, 228, attached to steering ring 302, contributes to elongate shaft member 210 bending or deflecting at least steerable portion 219. Such control via one or more of the steering members 226, 228 provides the ability to efficiently move elongate shaft member 210 and, for example, expandable structure 202, through a bodily opening providing a passageway (e.g., an artery), and accurately position expandable structure 202 within a bodily cavity (e.g., an atrium of a heart). Operation of the steering members 226, 228 may be accomplished via use of an actuator device, such as actuator device system 240, described below, which is provided, for example, and is based at least in part on teachings from FIGS. 15a, 15b, and 15c of U.S. Pat. No. 5,715,817, issued Feb. 10, 1998, to Stevens-Wright et al.

In some embodiments, the steerable portion 219 is positioned proximal (e.g., toward the proximal portion 212 of elongate shaft member 210) at least securing portions 214, 215 of the elongate shaft member 210, where the steering members 226, 228 are secured or terminated. According to various embodiments, securing portions 214, 215 are portions of the steerable catheter to which the distal parts of the steering members 226, 228 are physically connected and which are configured to generate a reactionary mechanical couple or moment in response to axial forces applied via the steering members, the reactionary mechanical couple or moment causing deflection of at least the steerable portion 219. In some embodiments, the steerable portion 219 is positioned proximal (e.g., toward the proximal portion 212 of elongate shaft member 210) steering ring 302.

In some embodiments, the elongate shaft member 210, by way of the various configurations of the various embodiments of the present invention, permits opposing movement of the steering member 226 and the steering member 228 to bend or deflect at least the steerable portion 219 of the elongate shaft member 210 in a first direction D1 of two opposing directions within a first plane (e.g., the plane of the sheet of FIGS. 4A, 4B, and 4C), and permits opposing movement of the steering member 226 and the steering member 228 to bend or deflect at least the steerable portion 219 of the elongate shaft member 210 in a second opposite direction D2 of the two opposing directions within the first plane (for example, as shown in FIGS. 4A and 4C). In some embodiments, the elongate shaft member 210 permits concurrent opposing movement of steering member 226 and steering member 228 to bend or deflect at least the steerable portion 219 of the elongate shaft member 210 in a first direction D1 of two opposing directions within a first plane, and permits concurrent opposing movement of steering member 226 and steering member 228 to bend or deflect the steerable portion 219 of the elongate shaft member 210 in a second opposite direction D2 of the two opposing directions within the first plane. According to various embodiments, bending or deflecting at least the steerable portion 219 of the elongate shaft member 210 in the first and second directions D1 and D2 may occur in a single plane and may be referred to as bidirectional bending.

Operation of the steering members 226, 228 to bend or deflect at least the steerable portion 219 of the elongate shaft member 210 may involve releasing tension in one of steering members 226, 228 and increasing tension (e.g., in a concurrent manner or a sequential manner) in the other of the steering members 226, 228, according to some embodiments. Additionally or alternatively, operation of the steering members 226, 228 to bend or deflect at least the steerable portion 219 of the elongate shaft member 210 may involve playing out or moving at least part of one of the steering members 226, 228 distally (e.g., in a direction from the proximal portion 212 of the elongate shaft member 210 toward the distal portion 213 of the elongate shaft member 210) and taking up or moving (e.g., in a concurrent manner or a sequential manner) at least part of the other of the steering members 226, 228 proximally (e.g., in a direction from the distal portion 213 of the elongate shaft member 210 toward the proximal portion 212 of the elongate shaft member 210). In this regard, the steering members 226, 228 may act as tendons, with bending or deflecting of at least the steerable portion 219 occurring in the direction toward the particular one of the steering members 226, 228 that at least (a) undergoes increased tension levels or (b) is taken up. It is noted, according to some embodiments, that the other one of the steering members 226, 228 that at least (c) undergoes decreased tension levels or (d) is played out, does so at least in order to not restrain or hinder the steerable portion 219 of the elongate shaft member 210 from bending or deflecting in the direction toward the particular one of steering members 226, 228 that is undergoing increased tension levels or is taken up.

Various one or more actuators may be employed to cause operation of the steering members 226, 228 to bend or deflect at least the steerable portion 219 of the elongate shaft member 210 in each of direction D1 and D2 or in each of two directions or vectors in a first plane. By way of non-limiting example, FIGS. 4A, 4B, and 4C (collectively FIG. 4) are schematic representations of an actuator device system 240 (also called an actuator, actuator set, control device, or control device system) coupled to the elongate shaft member 210 and operable for bending or deflecting at least part (e.g., steerable portion 219) of the elongate shaft member 210 in two directions within a first plane (e.g., a single plane) by manipulation of two steering members (e.g., steering members 226, 228 in FIGS. 4A, 4B, and 4C, according to some embodiments). Since the present invention is not limited to any particular technique for causing push/pull or take-up/play-out movement of steering members, FIG. 4 are provided as an example based in part on FIGS. 15a, 15b, and 15c of U.S. Pat. No. 5,715,817, issued Feb. 10, 1998, to Stevens-Wright et al., known in the art.

In various embodiments associated with FIGS. 4, manipulation of the steering members 226, 228 may occur concurrently. In FIGS. 4, each of the steering members 226, 228 is terminated, secured, connected, or fastened to respective ones of securing portions 214, 215 of the elongate shaft member 210. Additionally, the steering members 226, 228 are each terminated, secured, connected, or fastened to slider 242 of actuator set 240. Various guides 244 may be provided to guide steering members 226, 228 to their respective securing locations on slider 242, according to various embodiments. Slider 242 is guided by a guide system (such as a track or rail, according to some embodiments) to move in various directions (e.g., first direction 241a in FIG. 4A and second direction 241b in FIG. 4B). In some embodiments, movement of slider 242 may occur in response to direct manipulation thereof by a user. In some embodiments, movement of slider 242 may occur in response to operation of an electric motor or other actuator including pneumatic and hydraulic actuators. FIG. 4B shows slider 242 in an initial or ready position corresponding to a state before an actuated bending or deflection of steerable portion 219 of elongate shaft member 210. In the state of FIG. 4B, substantially equal levels of tension may be provided in the steering members 226, 228, such that no force differential or an insufficient force differential is applied by the steering members 226, 228 to securing portions 214, 215 to noticeably bend or deflect at least the steerable portion 219 predominately in one of the two directions D1 and D2. In some embodiments, however, a default tension level differential may be applied in the neutral actuator state to the steering members 226, 228 to cause a default force differential sufficient to bias steerable portion 219 to bend in a particular one of the two directions D1 and D2 by an initial or default amount when the slider 242 is positioned in the ready position. In FIG. 4A, slider 242 has been moved along direction 241a and has increased tension (e.g., represented by a relatively straight member form 246a) in steering member 226 while concurrently reducing tension (e.g., represented by the exaggerated wiggly member form 246b) in steering member 228 to bend steerable portion 219 in the direction D1. In FIG. 4C, slider 242 has been moved along direction 241b and has increased tension (e.g., represented by a relatively straight line form 248a) in steering member 228 while concurrently reducing tension (e.g., represented by the exaggerated wiggly line form 248b) in steering member 226 to bend steerable portion 219 in the direction D2. Other embodiments may employ other actuation systems to selectively bend or deflect at least the steerable portion 219 of the elongate shaft member 210 in either of directions D1 and D2.

Figure 5A:
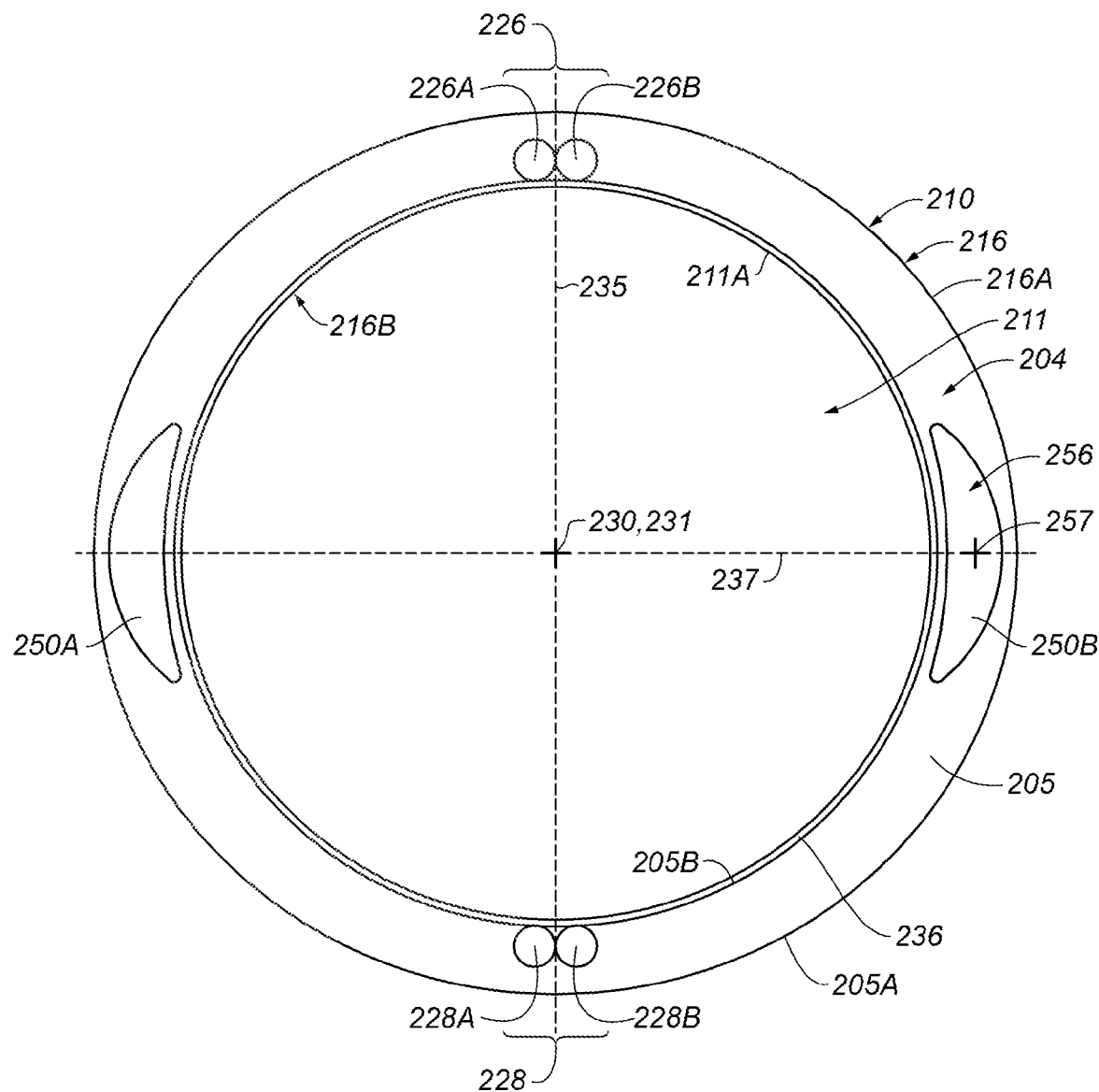
FIG. 5A is a cross-sectional view of an elongate shaft member of a medical system at a steerable portion of the elongate shaft member, according to some embodiments.

FIG. 5A is a cross-sectional view of the elongate shaft member 210 at steerable portion 219 of the elongate shaft member 210, according to some embodiments. It is noted that a same or similar cross-sectional view as that shown in FIG. 5A may occur at other points along the length of elongate shaft member 210. According to some embodiments, steering member 226 is provided by a set of steering members 226A, 226B, and steering member 228 is provided by a set of steering members 228A, 228B. Having steering member 226, steering member 228, or each of steering members 226, 228 take the form of a set of multiple steering members may be motivated by various reasons, including by way of non-limiting example, the use of smaller sized wires that, in number provide sufficient strength, but with a lower profile. Regardless, it is noted that, in some embodiments in which the set of multiple steering members 226A, 226B function as a single steering member 226 (for example, as described above), such set of multiple steering members may, therefore, be considered to be a single steering member, according to some embodiments. The same applies, for example, with the set of multiple steering members 228A, 228B, according to some embodiments. By way of non-limiting example, other cross-sectional shape portions including rectangular, square, oval, and elliptical may be employed by various ones of the steering members 226, 228 or individual steering members 226A, 226B, 228A, 228B thereof.

According to some embodiments, in a plane of a cross-section of the elongate shaft member 210, shown, e.g., at least by FIG. 5A, the steering members 226, 228 are disposed at opposite sides of the cross-section of the elongate shaft member 210 about an inner-, interior-, or internal-most location 231 within the elongate shaft member 210. In some embodiments, the elongate shaft member 210 may include a central longitudinal axis (e.g., central longitudinal axis 230). In some embodiments, the inner-, interior-, or internal-most location 231 in the plane of the cross-section of the elongate shaft member 210 (such cross-section including respective cross-sections of each axial member in the elongate shaft member 210) may be a location in the plane of such cross-section intersected by the central longitudinal axis 230, according to some embodiments. Accordingly, in some embodiments, the location of the inner-, interior-, or internal-most location 231 in the plane of the cross-section of the elongate shaft member 210 may also correspond to the location of the longitudinal axis 230 in the plane of the cross-section of the elongate shaft member 210 (with the understanding that the longitudinal axis 230 extends into and out of the plane of the sheet of FIG. 5A). Central longitudinal axis 230 may extend between the proximal portion 212 and the distal portion 213 of the elongate shaft member 210 and through a geometric center or centroid of each of one or more or all cross-sections of the elongate shaft member 210, according to some embodiments. As used herein, according to some embodiments, the phrase, longitudinal axis of the elongate shaft member 210, has the meaning of an axis along the lengthwise direction or vector of the elongate shaft member 210. As described above, portions of the elongate shaft member 210 may be bent during use. In such cases, as used herein, according to some embodiments, the longitudinal axis 230 would bend in a manner corresponding to any bending of the elongate shaft member 210. In some embodiments, the inner-, interior-, or internal-most location 231 within the elongate shaft member 210 in the plane of a cross-section of an axial member (e.g., an axial member being or including steering members 226, 228, or axial members 250A, 250B described in more detail below) within the elongate shaft member 210 is a centroid of a cross-section of the elongate shaft member 210 in the plane of the cross-section of the axial member. In some embodiments, the inner-, interior-, or internal-most location 231 within the elongate shaft member 210 in the plane of a cross-section of such an axial member is a centroid of a cross-section of a tubular member or tubular layer (e.g., all or a layer portion of the wall 204) of the elongate shaft member 210 in the plane of the cross-section of the axial member.

In FIG. 5A, the steering members 226, 228, and the individual steering members thereof 226A, 226B, 228A, 228B, according to some embodiments, are angularly spaced about and radially spaced from inner-, interior-, or internal-most location 231. It is noted, according to various embodiments, that the individual steering members 226A, 226B, 228A, 228B may each be contained in a respective lumen. In some embodiments, various ones of these respective lumens may be sized and dimensioned to allow movement or translation of the steering member within the lumen to, for example, impart a bending force in the elongate shaft member 210 at least as described above. Each of the lumens may be provided in various manners. In some embodiments, small tubular members made from a low friction material (e.g., polytetrafluoroethylene (PTFE), according to some embodiments) are molded within at least part of the elongate shaft member 210 to provide various ones the respective lumens that enclose, surround, or provide passageways for various ones of the steering members, such as individual steering members 226A, 226B, 228A, 228B.

In some embodiments, elongate shaft member 210 is, or includes, a tubular member. In some embodiments, the wall 204 of the elongate shaft member 210 is arranged in a tubular configuration and may be considered a tubular member of the elongate shaft member 210. According to some embodiments, the wall 204 of the elongate shaft member 210 is provided at least in part by a tubular member of the elongate shaft member. In some embodiments, elongate shaft member 210 includes one or more lumens extending between the proximal portion 212 and distal portion 213 of the elongate shaft member 210. FIG. 5A is a cross-sectional view of elongate shaft member 210 including a lumen 211, according to various embodiments. In some embodiments, the elongate shaft member 210 is an elongate sheath that includes a lumen 211 sized and dimensioned to selectively allow passage of a medical instrument therethrough during percutaneous or intravascular delivery of the medical instrument along a path through the lumen 211. In some embodiments, the medical instrument includes an expandable structure (e.g., expandable structure 202). In some embodiments, the elongate shaft member 210 including lumen 211 is physically coupled to an expandable structure (e.g., expandable structure 202). For example, the elongate shaft member 210 including lumen 211 may form at least part of a medical instrument (e.g., a diagnostic or treatment catheter).

In various embodiments, elongate shaft member 210 may include various layers. In some embodiments, the various layers are arranged in a concentric arrangement. In FIG. 5A, a low friction material layer 236 (e.g., a polytetrafluoroethylene (PTFE) layer) is employed, according to various embodiments. The use of a material layer such as layer 236 may be motivated for different reasons. For example, a low friction material layer, such as layer 236, may be appropriately located in elongate shaft member 210 to facilitate movement of a particular element (e.g., a medical instrument) through a lumen provided in elongate shaft member 210. According to some embodiments, layer 236 may be considered a tubular layer of the elongate shaft member 210. According to some embodiments, layer 236 may be considered to be a tubular member, or at least a tubular layer of a tubular member, of the elongate shaft member 210. Various layers made from metallic or non-metallic materials may be incorporated into elongate shaft member 210, according to various embodiments. In some of these various embodiments, some of these layers may be reinforcement layers or backing layers for other layers or components provided within elongate shaft member 210.

As described above, according to some embodiments, the catheter may include a first steering member 226 (which may include, e.g., steering sub-members 226A, 226B) and a second steering member 228 (which may include, e.g., steering sub-members 228A, 228B). An actuator set 240 may be configured to manipulate the first steering member, the second steering member, or both the first steering member and the second steering member, to cause bending or deflection of at least the steerable portion 219 in a first particular plane. In FIG. 5A, the first particular plane is represented by line 235, which extends between first steering member 226 and the second steering member 228. It is understood that line 235 represents the first particular plane as viewed on edge. According to various embodiments, the force vectors created by the steering members lie on the first particular plane between the two steering members. In some embodiments, each of the first steering member 226 and the second steering member 228 includes a respective axis extending between the actuator set 240 and the steerable portion 219. In some embodiments, the steering member may include multiple sub-members (e.g., first steering member 226 includes steering members 226A, 226B) and the respective axis of the steering member extends through a centroid of a combination of the cross-sectional areas of the sub-members. In some embodiments, the axis of the first steering member 226 and the axis of the second steering member 228 lie in the first particular plane.

Various spatial relationships between the steering members 226, 228 may be employed, according to various embodiments. For example, with reference to FIG. 5, the steering members 226, 228 may be arranged in certain configurations within (e.g., within wall 204 of) elongate shaft member 210. For example, in some embodiments, the steering members 226, 228 are angularly spaced about and radially spaced from the inner-, interior-, or internal-most location 231 within the elongate shaft member 210, (e.g., as viewed along the longitudinal axis 230) with at least an angular spacing between the first steering member 226 and the second steering member 228 being approximately 180 degrees.

Various problems can occur when actuator set 240 applies force via one or both of steering members 226, 228 to cause bending or deflection of at least the steerable portion 219 of the elongate shaft member 210 in the first particular plane (e.g., represented by line 235 at least in FIG. 5A). For example, an undesired lateral bending or deflection of the at least the steerable portion 219 of the elongate shaft member 210 may occur during deflection in the first particular plane. This undesired lateral bending or deflection may occur for different reasons. For example, manufacturing deviations may create cross-sectional variabilities along at least part of the length of the at least the steerable portion 219 of the elongate shaft member 210, which increase a propensity of the steerable portion 219 to laterally deflect under the application of tensile forces via a steering member (e.g., 226 or 228). Undesired lateral deflection may also occur if the steering members 226, 228 are not properly axially aligned within the elongate shaft member 210 as they extend between the actuator set 240 and the steerable portion 219. If a steering member (e.g., 226 or 228) extends along even a minor or shallow helical path between actuator set 240 and steerable portion 219, forces imparted via the steering member may lead to a movement that can result in the undesired lateral deflection.

Other undesired effects can occur when actuator set 240 applies force via one or both of steering members 226, 228 to cause bending or deflection of at least the steerable portion 219 of the elongate shaft member 210 in the first particular plane. For example, a tensile force applied by a steering line (e.g., 226 or 228) during bending or deflection of at least the steerable portion 219 may cause the elongate shaft member 210 to compress or shorten by an undesired amount. When this occurs, a distal end portion of the elongate shaft member 210 may not be at an expected position or location after the bending or deflection of the at least the steerable portion 219 of the elongate shaft member 210. The present inventors have, in some instances, encountered approximately 5 mm to 10 mm of shortening during deflection of catheters having elongate shaft member outer, exterior, or external diameters of approximately 7 mm. In applications in which the catheter is employed to position a medical instrument or an implant at a desired location in the body, such shortening of the catheter during deflection is counter to positional accuracy. It is noted that this shortening effect is more prominent with catheters having relatively smaller diameters and with catheters having relatively longer lengths.

According to some embodiments of the present invention, the above-discussed undesired out-of-plane bending and undesired catheter shortening may be reduced due at least to axial member 250A, axial member 250B, or both axial members 250A, 250B shown at least in FIG. 5A. In this regard, in some embodiments, the cross-section of the elongate shaft member 210 shown in FIG. 5A includes an axial member set made up of one or more axial members (e.g., a group of axial members according to some embodiments associated with FIG. 5A). In FIG. 5A, the elongate shaft member 210 includes an axial member 250A, according to some embodiments, and an axial member 250B, according to some embodiments. According to some embodiments, at least part of each axial member 250A, 250B is incorporated into the elongate shaft member 210. According to some embodiments, at least part of each axial member is incorporated into a wall (e.g., wall 204) of the elongate shaft member 210.

According to some embodiments, an axial member such as axial member 250A or 250B may be employed to mitigate, alleviate, or reduce the undesired effects associated with improper deflection and shortening of the at least the steerable portion 219 of the elongate shaft member 210 (for example, the undesired effects described above). In this regard, according to some embodiments, axial members such as axial members 250A, 250B act as strengthening members or stiffening members employed to alleviate or reduce various problems such as, but not limited to, undesired lateral deflection during steering or undesired compressive shortening during steering. Various considerations should be taken into account when axial members (e.g., 250A or 250B) are employed as strengthening members or stiffening members. In some embodiments, these axial members should provide, according to some embodiments, (a) sufficient lateral stiffness, or (b) sufficient compressive stiffness, or both (a) and (b) while minimizing increases to the overall diameter of the elongate shaft member 210 or unduly increasing the forces required to steer at least the steerable portion 219 of the elongate shaft member 210.

In general, the outer, exterior, or external dimension (e.g., outer, exterior, or external diameter) of the elongate shaft member 210 is usually determined by the thickest member incorporated into (e.g., into wall 204 of) the elongate shaft member 210. According to some embodiments, the maximum thickness (e.g., thickness in a radial direction in the cross-section of the elongate shaft member 210 shown in FIG. 5A) of the cross-section of the axial members 250A, 250B is chosen to be similar to, or the same as, the thickness of the steering members 226 or 228. However, it is noted that reducing the thickness of the axial members 250A, 250B can reduce their resistance to compressive loading. According to some embodiments, providing axial member 250A, 250B with a curved cross-sectional form to conform to constraints of wall 204 would also reduce or maintain the outer, exterior, or external dimension of the elongate shaft member 210 within desired limits. One such embodiment is exemplified in FIG. 5A.

The compressive strength of each axial member (e.g., 250A or 250B) is related to the cross-sectional area of the axial member. It is desirable, according to some embodiments, to increase the cross-sectional area of the axial member to allow the elongate shaft member 210 to withstand compressive forces produced by tension in the steering members 226 or 228 without significant compressive shortening. It is noted that compressive strength is not materially affected by the shape of the axial member (e.g., 250A or 250B), but rather is more significantly affected by the cross-sectional area of the axial member. According to various embodiments, addressing compressive strength requirements may not be a major factor when choosing the particular cross-sectional shape of the axial member (e.g., 250A or 250B), provided the particular cross-sectional shape has adequate cross-sectional area.

Figure 5B:
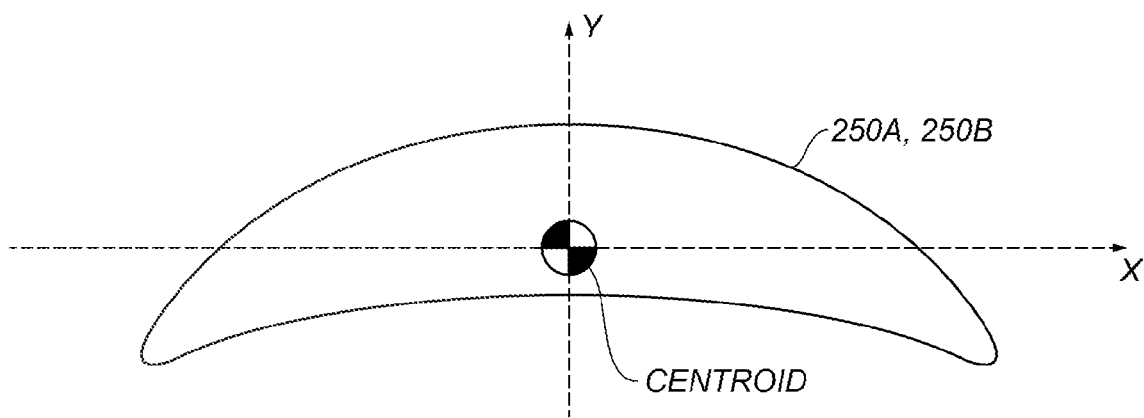
FIG. 5B is a cross-sectional view of an axial member of an elongate shaft member of a medical system, according to some embodiments.

According to some embodiments, the axial member (e.g., 250A or 250B) may require sufficient compressive buckling resistance to prevent buckling failures of the axial member itself under the influence of compressive forces caused by tension in the steering members 226, 228. In some cases, compressive bucking failures may cause the axial member to break, and, in some instances, snap outwardly through the outer, exterior, or external surface of the wall 204 of the elongate shaft member 210. Such instances can pose a safety hazard. Compressive buckling failures may be mitigated in various ways, according to some embodiments. According to some embodiments, various reinforcement structures (e.g., described below) may be used to reduce the unsupported length of various parts of the respective axial member (e.g., 250A or 250B) to increase buckling resistance and reduce risk of puncturing of a surface of the wall 204 of the elongate shaft member 210 by an axial member. Compressive bucking resistance is also related to the second moment of area of the cross-section 256 of the axial member (e.g., 250A or 250B). The second moment of area, also known as the moment of inertia, is a geometric property of an area which reflects how its points are distributed with regards to a particular area. For example, FIG. 5B shows an "X" axis and "Y" axis superimposed on the centroid or geometric center of the cross-sectional shape of the axial member (e.g., 250A or 250B). In this regard, the cross-sectional shape of the axial member would have a second moment of area Ix about the X axis, and a second moment of area Iy about the Y axis. In some embodiments associated with FIG. 5A, the Y axis corresponds to a radial axis in the cross-section of the elongate shaft member 210. Ix is smaller than Iy in various embodiments associated with FIGS. 5A, 5B and, accordingly, there is a propensity for the axial member to buckle in a direction associated with the Y axis radially inward or radially outward in some embodiments. In these particular embodiments, it is noted that increases in Ix can in turn increase the compressive buckling resistance of the axial member. Ix can be increased in various manners. For example, a thickness of the axial member (e.g., in the y direction) can be increased, but this approach may require an undesired increase in an overall dimension (e.g., outside diameter) of the elongate shaft member 210. The curved shape of the cross-sectional shape of the axial member (e.g., 250A or 250B) can also be adjusted to increase Ix and thus increase compressive buckling resistance. According to some embodiments associated with FIGS. 5A, 5B, the cross-sectional shape of the axial member (e.g., 250A or 250B) is curved radially inward (e.g., toward the inner-, interior-, or internal-most location 231 in the elongate shaft member 210 to increase Ix without unduly increasing the overall dimension (e.g., outer, exterior, or external diameter) of the elongate shaft member 210.

In some embodiments associated with FIG. 5A, a second particular plane (e.g., represented by line 237) intersects the cross-section of the elongate shaft member 210, with the central longitudinal axis 230 of the elongate shaft member 210 lying on or in the second particular plane. According to some embodiments, the above-discussed first particular plane in which occurs the deflection of the at least the steerable portion 219 of the elongate shaft member 210 (e.g., such first particular plane represented by line 235 in at least FIG. 5A) is non-parallel with the second particular plane (e.g., represented by line 237). According to some embodiments, the second particular plane (e.g., represented by line 237) intersects the first particular plane (e.g., represented by line 235). According to some embodiments, the first particular plane (e.g., represented by line 235) and the second particular plane (e.g., represented by line 237) are orthogonal planes. According to some embodiments, the first particular plane (e.g., represented by line 235) and the second particular plane (e.g., represented by line 237) intersect the inner-, interior-, or internal-most location 231 within the elongate shaft member 210 at least in the plane of the cross-section of the elongate member shown in FIG. 5A.

In some embodiments, the second particular plane (e.g., represented by line 237) extends between the two axial members (e.g., 250A and 250B). In some embodiments, the second particular plane (e.g., represented by line 237) extends between the respective centroids or geographic centers of the two axial members (e.g., 250A and 250B). According to various embodiments, a respective axis (e.g., longitudinal axis) of each of a first axial member 250A and the second axial member 250B lie on or in the second particular plane (e.g., represented by line 237).

In some embodiments, the catheter (e.g., an example of medical system 200, according to some embodiments) includes a first axial member (e.g., axial member 250A) and second axial member (e.g., axial member 250B), each of the first and second axial members having a respective axis (e.g., a longitudinal axis) extending between the proximal portion 212 of the elongate shaft member 210 and the distal portion 213 of the elongate shaft member 210. In some embodiments, each respective axis (e.g., longitudinal axis) of the first and second axial members intersects the respective centroid or geographic center of the corresponding first axial member (e.g., first axial member 250A) or second axial member (e.g., second axial member 250B). In some embodiments at least in which the steering members 226, 228 are considered axial members, each respective axial-member axis (e.g., longitudinal axis) intersects the respective centroid or geographic center of the assemblage of the sub-members (e.g., 226A, 226B or 228A, 228B) of the corresponding axial member. For example, the respective longitudinal axis of the axial member 226 may pass through the point where the circular cross-sections of the individual sub-members 226A, 226B meet, i.e., the center of the combined cross-sectional areas of the assemblage of the sub-members 226A, 226B.

According to various embodiments, the first axial member (e.g., axial member 250A), the second axial member (e.g., axial member 250B), or each of the first and the second axial members is embedded in (e.g., embedded in wall 204 of) the elongate shaft member 210 to resist axial movement thereof. In some embodiments, an actuator (e.g., of at least part of actuator device system 240) is operatively coupled to the steerable portion 219 to cause deflection of the steerable portion to cause bending or deflection of at least the steerable portion 219 in the first particular plane (e.g., represented by line 235 in FIG. 5A) and the first axial member (e.g., axial member 250A), the second axial member (e.g., axial member 250B) or each of the first and the second axial members is configured to resist, at least in part, lateral bending or deflection of the at least the steerable portion 219 away from the first particular plane during the bending or deflection of the at least the steerable portion 219 in the first particular plane.

It is noted that increases in Ix to increase compressive buckling resistance also increase the resistance to at least the steerable portion 219 laterally deflecting away from the first particular plane during the steering thereof. It is noted, however, that, if the axial member (e.g., 250A or 250B) includes an inordinately large Iy (i.e., an inordinately large second moment of area about the Y axis), such large Iy may have a significant effect on the bending stiffness of the elongate shaft member 210, and, therefore, may undesirably increase the force required to steer, bend, or deflect at least the steerable portion 219 of the elongate shaft member 210. According to some embodiments, reduction of this adverse impact on the steering force may be accomplished by reducing Iy. According to some embodiments, the cross-sectional shape of the axial member (e.g., 250A or 250B) is bent or curved inwardly (e.g., in a direction toward the inner-, interior-, or internal-most location 231 of the elongate shaft member 210) to reduce Iy (e.g., by reducing an overall dimension of the cross-sectional shape of the axial member along the x axis). It is noted that this bent or curved form also increases Ix (e.g., by increasing an overall dimension of the cross-sectional shape of the axial member along the y axis) and increases the compressive buckling resistance provided by the axial member. Accordingly, adjusting the cross-sectional shape of the axial member (e.g., 250A or 250B) as per the various embodiments and factors described herein can help to improve compressive strength, compressive buckling resistance, and resistance to lateral deflection during steering, while avoiding an increase in the overall outer, exterior, or external dimensions of the elongate shaft member 210. The following axial member (e.g., 250A and 250B) descriptions elaborate on these aspects and provide example axial member characteristics and other features, according to various embodiments of the present invention. It is noted however, that various embodiments are not limited to the particular shapes of the axial members 250A, 250B shown in FIG. 4A. Various other shapes may be employed by other axial members employed as strengthening members or stiffening members to alleviate or reduce problems, such as the aforementioned lateral deflection and compression shortening. By way of non-limiting example, other cross-sectional shapes including rectangular, square, oval, and elliptical may be employed by various ones of the axial members 250A, 250B, according to various example embodiments.

Figure 5C:
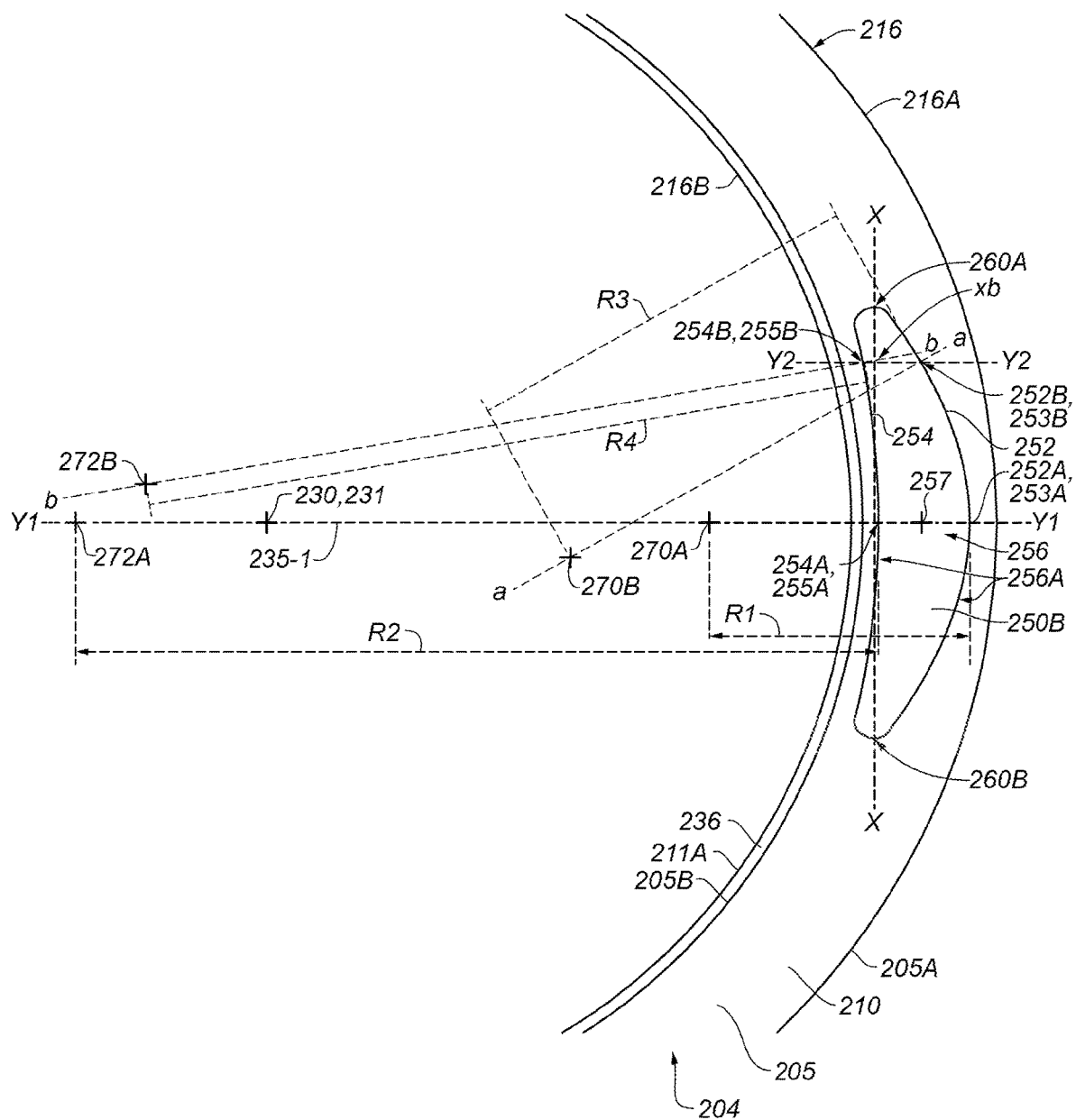
FIG. 5C is a cross-sectional view of an elongate shaft member of a medical system, the cross-sectional view including a cross-section of an axial member of the elongate shaft member, and the cross-sectional view illustrating some characteristics of the axial member, according to some embodiments.

FIG. 5C is a view of a cross-section 256 of an axial member (axial member 250B in the example of FIG. 5C) incorporated into the elongate shaft member 210 (i.e., a partial section thereof shown in FIG. 5C) at a particular location along an axis of the axial member, the axis of the axial member extending between the proximal portion 212 of the elongate shaft member 210 and the distal portion 213 of the elongate shaft member 210. Although FIG. 5C shows axial member 250B, it is understood that corresponding descriptions and illustrations apply to axial member 250A, according to some embodiments. In this regard, when descriptions herein refer to axial member 250B alone for convenience, it is understood that such descriptions correspondingly may apply to axial member 250A, and vice versa. According to various embodiments, the cross-section 256 of the axial member 250B is perpendicular to the axis of the axial member 250B. In this regard, in some embodiments, such axis may be located as represented by axis 257 in FIG. 5C (shown as a plus sign in FIG. 5C indicating that the axis 257 protrudes perpendicularly into and out of the sheet of FIG. 5C), although other axis locations and orientations of the axial member 250B may be applied in other embodiments. In some embodiments, the axis 257 is a longitudinal axis of the axial member 250B. In some embodiments, such longitudinal axis passes through a centroid or geographic center of each of at least some cross-sections (including cross-section 256) of the axial member 250B, such as cross-sections of the axial member 250B through the proximal portion 212 of the elongate shaft member 210, through the steerable portion 219 of the elongate shaft member 210, and, in some embodiments, through the distal portion 213 of the elongate shaft member 210. According to various embodiments, the cross-section 256 of the axial member 250B in FIG. 5C includes a first edge portion 252 and second edge portion 254 located on an opposite side of the cross-section 256 of the axial member 250B from the first edge portion 252. According to various embodiments, the first edge portion 252 and the second edge portion 254 define (e.g., collectively define in some embodiments) an outer, exterior, or external boundary 256A (e.g., an entire outer, exterior, or external boundary in some embodiments) of the cross-section 256 of the axial member 250B. In this regard, the entirety of the outer, exterior, or external boundary 256A of the cross-section 256 of the axial member 250B may be provided by the first edge portion 252 and the second edge portion 254, according to various embodiments.

In some embodiments, the axial member 250B is incorporated into a wall of a tubular member of the elongate shaft member 210, the tubular member or a tubular layer thereof forming a closed shape in a plane of a cross-section 256 of the axial member. For example, in at least FIGS. 5A, 5C, the tubular member may include or be all or a portion (e.g., a tubular layer) of the wall 204 of the elongate shaft member 210, according to some embodiments. In some embodiments, the axial member (e.g., axial member 250A or axial member 250B) is incorporated into a wall of a tubular layer 205 of a tubular member of the elongate shaft member 210. In some embodiments, the wall 204 of the elongate shaft member 210 forms a closed shape in the plane of the cross-section 256 of the axial member (e.g., 250A or 250B). According to some embodiments, the closed shape includes a closed outer edge (e.g., formed in part by the outer, exterior, or external edge 216A provided by outer, exterior, or external surface 216 of the elongate shaft member 210 in some embodiments) and a closed inner edge (e.g., formed in part by inner, interior, or internal edge 216B of elongate shaft member 210 in some embodiments) located more interior of the closed shape than the closed outer edge. In some embodiments, the closed outer edge of the wall 204 does not intersect the closed inner, interior, or internal edge. In some embodiments, an inner, interior, or internal region (such as within lumen 211) encompassed by the wall 204 in the plane of the cross-section 256 of the axial member is bounded by the closed inner edge of the closed shape of the wall 204 of the elongate shaft member 210 in the plane of the cross-section 256 of the axial member. In some embodiments, the closed shape of the wall 204 of the elongate shaft member 210 in the plane of the cross-section 256 of the axial member is defined as not including the inner, interior, or internal region. According to some embodiments, the cross-section 256 of the axial member is incorporated into the closed shape of the wall 204 of the elongate shaft member 210 in the plane of the cross-section 256 of the axial member and is not located in the inner, interior, or internal region in the plane of the cross-section 256 of the axial member bounded by the closed inner edge of the closed shape of the wall 204 of the elongate shaft member 210 in the plane of the cross-section 256 of the axial member.

In some embodiments, the axial member (e.g., 250A or 250B) is embedded or incorporated into at least a wall of the tubular layer 205 or a wall 204 of the elongate shaft member 210 to resist axial movement thereof. Embedding, incorporating, or securing of relatively large surface portions of the axial member within the elongate shaft member 210 (e.g., via the tubular layer 205 or wall 204) may be motivated for different reasons. For example, when employed as a strengthening or stiffening member, embedding of relatively large portions of the axial member within the elongate shaft member 210 creates a stiffer composite structure that can better resist loads during steering of at least the steerable portion 219. Compressive buckling effects are also reduced when the axial member is embedded.

In some embodiments, the tubular member may include one or more tubular layers. For instance, in some embodiments, the tubular member is the tubular layer 205. In some embodiments, the tubular member includes the tubular layer 205 and the low friction layer 236. In some embodiments, the tubular layer 205 itself includes multiple layers. In some embodiments in which the tubular member includes the tubular layer 205, the tubular layer 205 forms a closed shape in the plane of the cross section 256 of the axial member 250B. In some embodiments, such closed shape may be bounded by, e.g., inner, interior, or internal edge 205B of the tubular layer 205 and outer, exterior, or external edge 205A of the tubular layer 205, as shown in the cross-sections of FIGS. 5A and 5C, for example, although other edges of such a closed shape may exist in other embodiments, depending on the composition of the respective tubular layer, as discussed in more detail below.

Figure 5D:
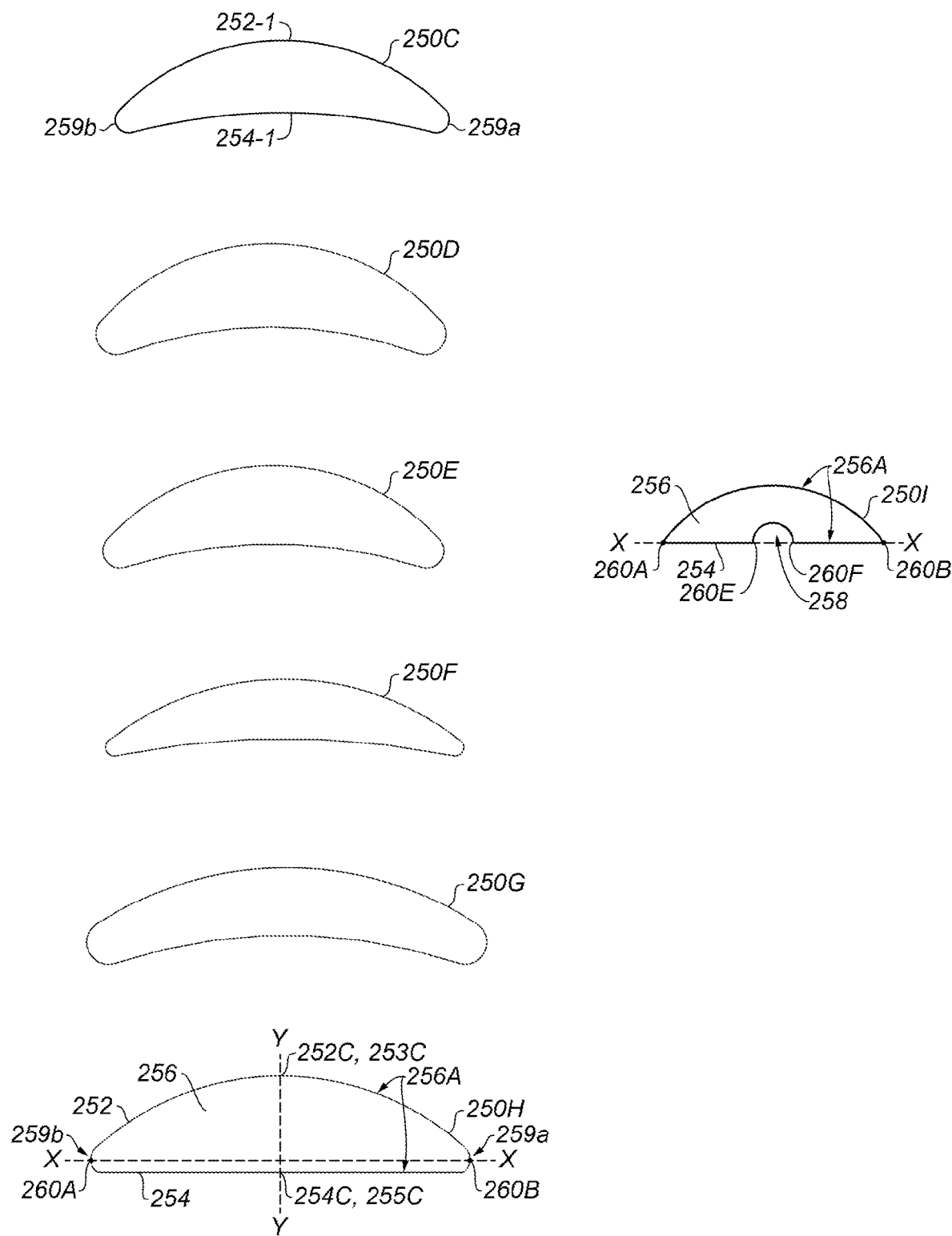
FIG. 5D shows cross-sectional views of various axial members that may be employed in an elongate shaft member of a medical system, according to some embodiments.
Figure 5E:
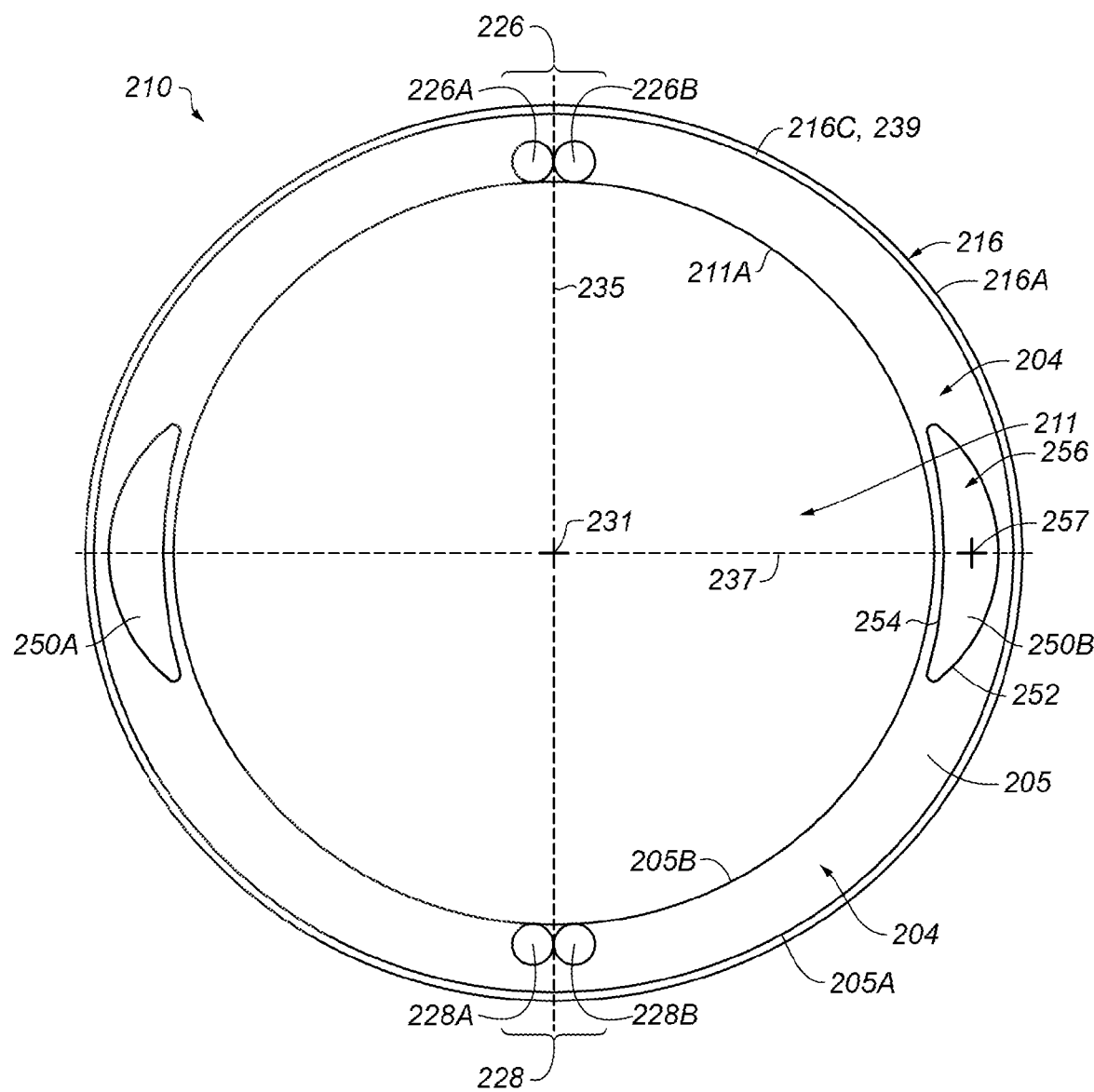
FIG. 5E is a cross-sectional view of an elongate shaft member of a medical system at a steerable portion of the elongate shaft member, according to some embodiments.

According to various embodiments, the tubular layer 205 surrounds a lumen (e.g., lumen 211) provided in the elongate shaft member 210. According to various embodiments, the inner, interior, or internal edge 205B of the cross-section of the tubular layer 205 surrounds a lumen (e.g., lumen 211) provided in the elongate shaft member 210. In some embodiments, the tubular layer 205 is a first tubular layer 205, and the elongate shaft member 210 includes a second tubular layer (e.g., low friction layer 236), with such first tubular layer and second tubular layer forming at least part of a tubular member of the elongate shaft member 210. In some embodiments, the second tubular layer (e.g., low friction layer 236) is coaxially arranged with the first tubular layer 205, with the second tubular layer positioned inwardly from the first tubular layer 205. In some embodiments, the inner, interior, or internal edge 205B of the closed shape of the tubular layer 205 in the plane of the cross-section 256 of the axial member (e.g., 250A or 250B) defines an edge of a closed shape of a lumen within the plane of the cross-section 256 of the axial member (e.g., 250A or 205B). For example, FIG. 5E is an embodiment based on the elongate shaft member 210 shown in FIG. 5A, but without the presence of low friction layer 236. In the embodiment of FIG. 5E, the closed shape of the tubular layer 205 in the plane of the cross-section 256 of the axial member (e.g., 250A or 250B) defines an edge 211A of a closed shape of the lumen 211 within the plane of the cross-section 256 of the axial member (e.g., 250A or 250B).

According to some embodiments, each of the first edge portion 252 of the cross-section 256 (e.g., FIG. 5C) of the axial member 250B (in the case of FIG. 5C) and the second edge portion 254 of the cross-section 256 of the axial member 250B is distanced, in the plane of the cross-section 256 of the axial member 250B, from either or each of (a) an outer, exterior, or external edge of the closed shape of the tubular member or, e.g., a tubular layer thereof, and (b) an inner, interior, or internal edge of the closed shape of the tubular member or, e.g., a tubular layer thereof. For example, in FIG. 5E, where the low friction layer 236 is not present, the tubular member may be considered to be provided by tubular layer 205, and each of the first edge portion 252 of the cross-section 256 of the axial member (e.g., 250A or 250B) and the second edge portion 254 of the cross-section 256 of the axial member is distanced, in the plane of the cross-section 256 of the axial member, from each of (a) an outer, exterior, or external edge 205A of the closed shape of the tubular layer 205, and (b) an inner, interior, or internal edge 205B of the closed shape of the tubular layer 205, according to some embodiments. In various embodiments in which the tubular member is made of several tubular layers (e.g., tubular layer 205 and low friction layer 236 in FIGS. 5A and 5C, according to some embodiments), and the tubular member is be considered to be provided at least by tubular layer 205, each of the first edge portion 252 of the cross-section of the axial member (e.g., 250A or 250B) and the second edge portion 254 of the cross-section 256 of the axial member is distanced, in the plane of the cross-section of the axial member, from each of (a) an outer, exterior, or external edge 205A of the closed shape of the tubular member, and (b) an inner, interior, or internal edge 205B of the closed shape of the tubular member.

In some embodiments, in the plane of the cross-section 256 of the axial member (e.g., 250A or 250B), the outer, exterior, or external edge of the closed shape of the tubular member or, e.g., the tubular layer 205 thereof, is provided at least in part by an edge, such as outer, exterior, or external edge 216A, of an outer, exterior, or external surface 216 of the elongate shaft member 210. In some embodiments, the outer, exterior, or external edge 205A of the closed shape of the tubular member or, e.g., the tubular layer 205 thereof, is provided at least in part by the outer, exterior, or external surface 216 of the elongate shaft member 210.

In some embodiments, the outer, exterior, or external edge (e.g., 205A) of the closed shape of the tubular member or, e.g., the tubular layer 205 thereof, is distanced from an outer, exterior, or external surface 216 (e.g., formed at least in part by outer, exterior, or external edge 216A) of the elongate shaft member 210 in the plane of the cross-section 256 of the axial member (e.g., 250A or 250B). For example, in some embodiments, such as that shown in FIG. 5E, the elongate shaft member 210 may include a structure 216C that surrounds or encompasses the tubular member or, e.g., the tubular layer 205 thereof, such that the tubular member or, e.g., the tubular layer 205 thereof, resides within or within an interior region of the elongate shaft member 210 (e.g., tubular layer 205 is inside or underneath structure 216C in FIG. 5E). In some embodiments, the outer, exterior, or external edge 205A of the closed shape of the tubular member or, e.g., tubular layer 205 thereof, is distanced from an edge (e.g., outer, exterior, or external edge 216A or inner, interior, or internal edge 216B) of a surface, such as an inner, interior, or internal surface or an outer, exterior, or external surface, of the elongate shaft member 210 at least in the plane of the cross-section 256 of the axial member (e.g., 250A or 250B). For instance, as shown in FIG. 5E, in some embodiments, the outer, exterior, or external edge 205A of the closed shape of the tubular layer 205 is distanced from an edge 211A of lumen 211 and is also distanced from an edge 216A of the surface 216 of the elongate shaft member 210 at least in the plane of the cross-section 256 of the axial member 250B.

In some embodiments, the tubular layer 205 is a first tubular layer, and the elongate shaft member includes a second tubular layer coaxially arranged with the first tubular layer, the second tubular layer positioned outwardly from the first tubular layer. For example, in some embodiments associated with FIG. 5E, the structure 216C may be an additional polymer layer that is considered a second tubular layer 239, and which may be a part of the elongate shaft member 210 that surrounds or encompasses the first tubular layer 205, with, e.g., the first tubular layer 205 and the second tubular layer 239 forming at least part of a tubular member of the elongate shaft member 210. According to some embodiments, the second tubular layer 239 is coaxially arranged with the first tubular layer 205, such that, e.g., both share the same inner-, interior-, or internal-most location 231. In some embodiments, the second tubular layer 239 is positioned outwardly from the first tubular layer 205 (e.g., with respect to the inner-, interior-, or internal-most location 231 within the elongate shaft member 210).

Figures 1, 5F:
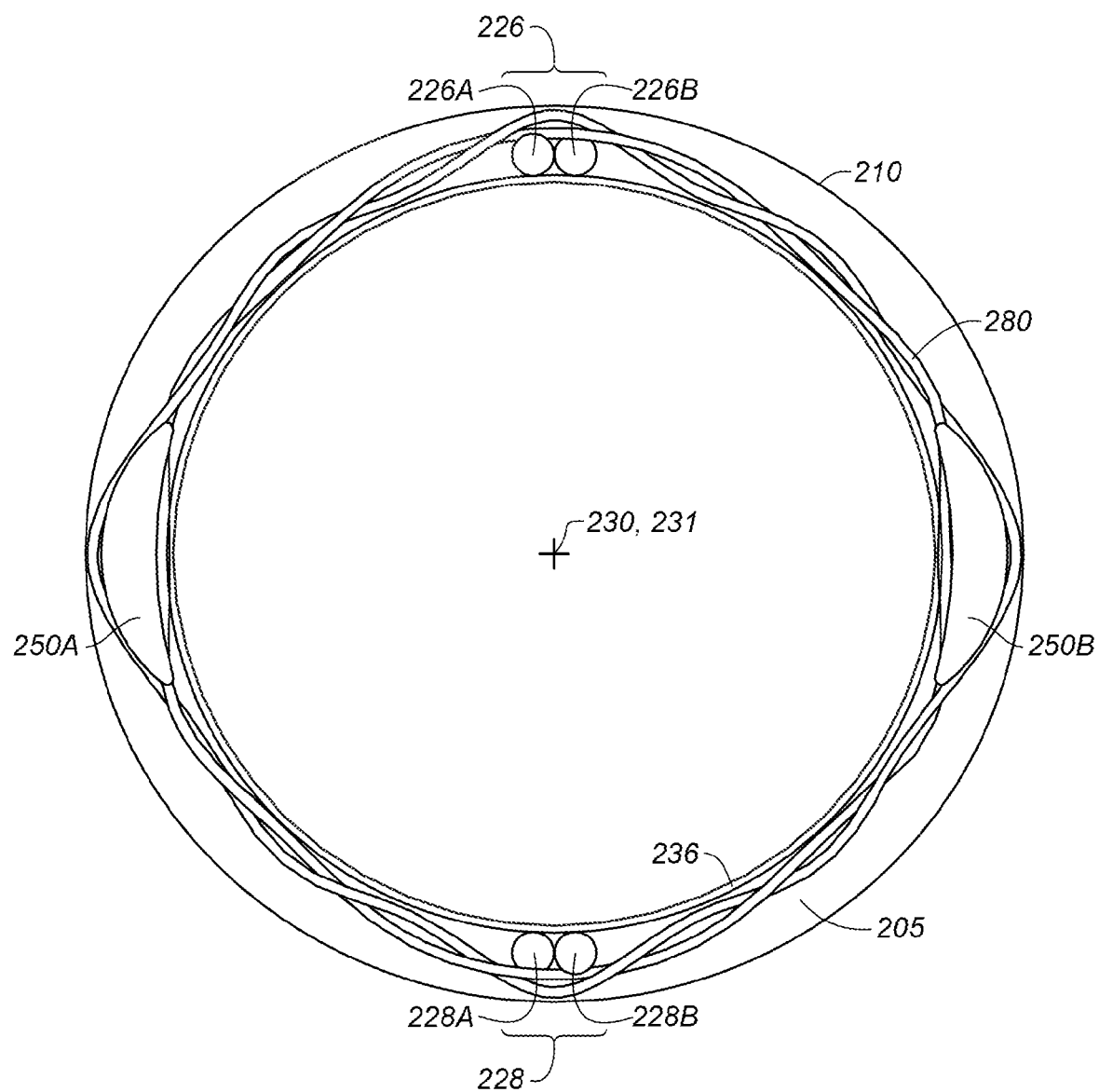
Figures 2, 5F:
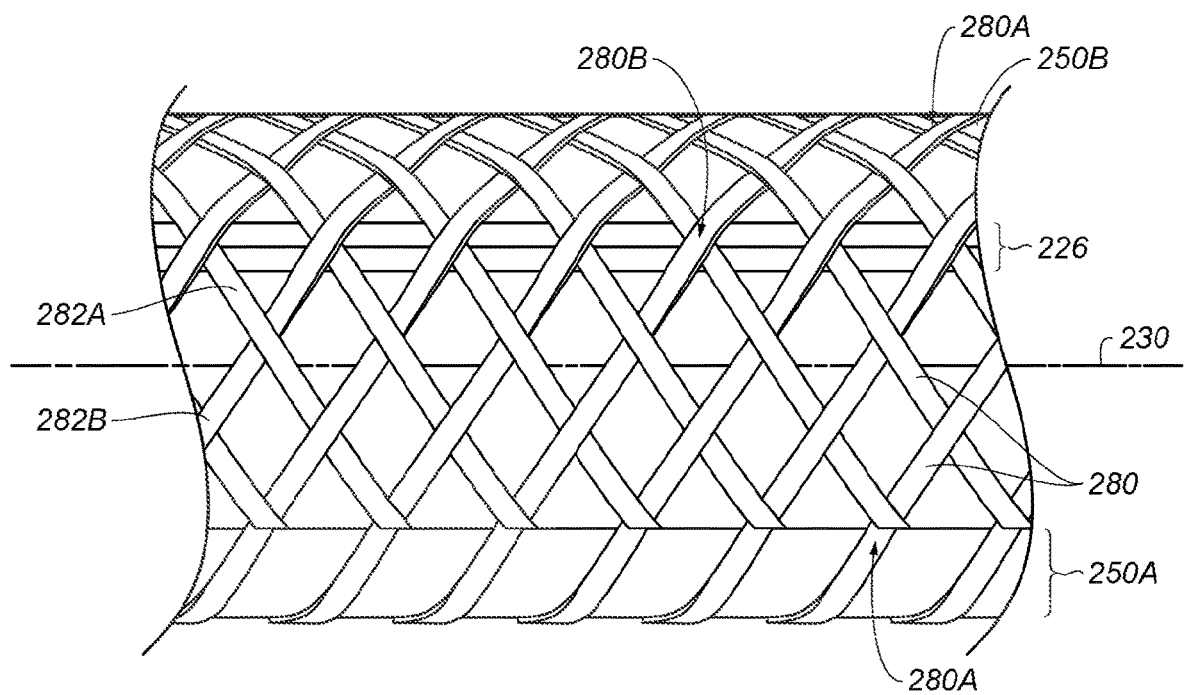
Figure 5G:
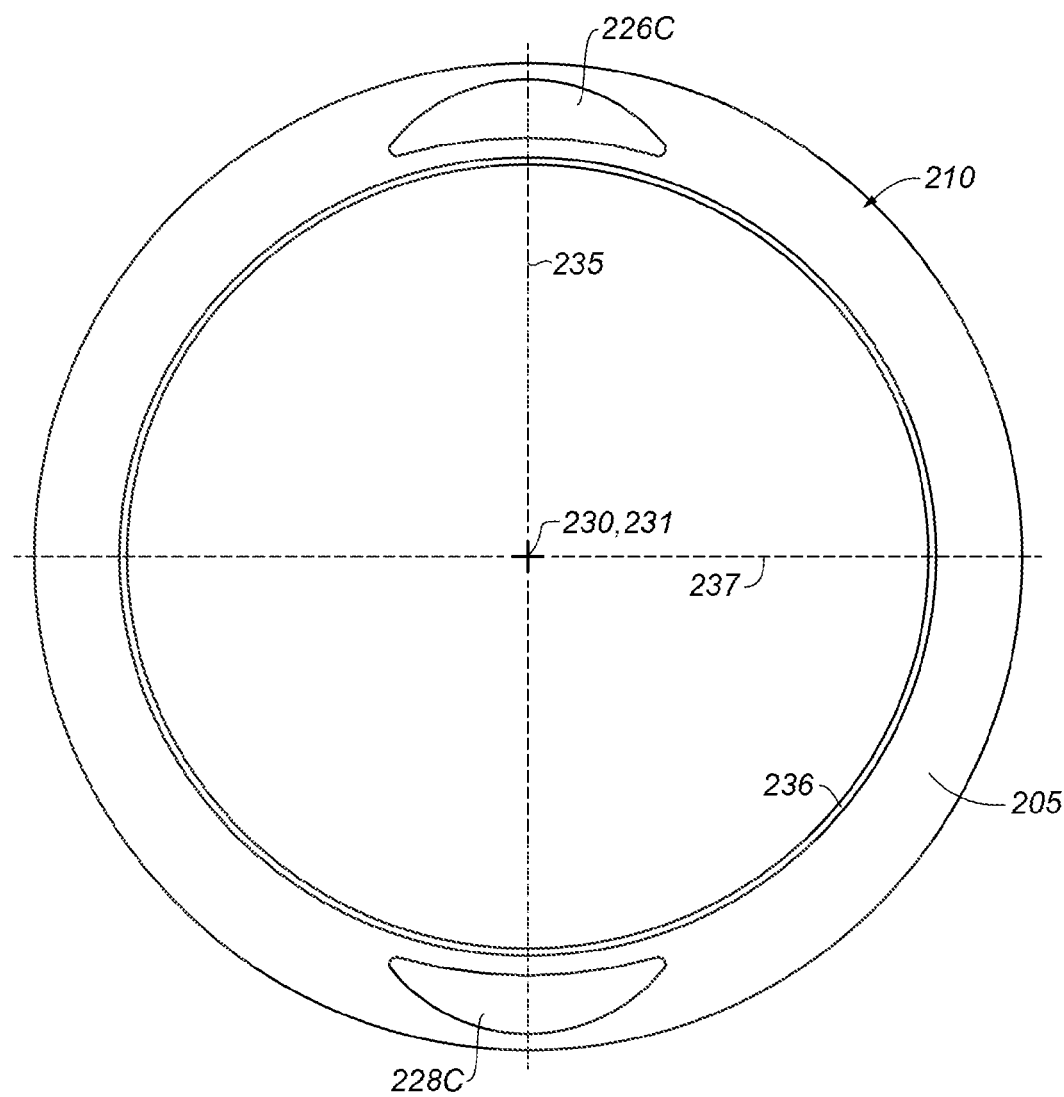
FIG. 5G is a cross-sectional view of an elongate shaft member of a medical system, according to some embodiments.

According to some embodiments, the elongate shaft member 210 includes a reinforcement structure. For example, FIG. 5F-1 is partial cross-section of an embodiment of elongate shaft member 210 including axial members 250A and 250B similar to that shown in FIG. 5A, but with the addition of a reinforcement structure 280. In this regard, the partial cross-section of FIG. 5F-1 shows a cross-section of the wall 205 of the elongate shaft member 210, but a longitudinal region of the braided reinforcement structure 280 is shown to give a better sense of some embodiments of the weaving structure of braided reinforcement structure 280. In this regard, FIG. 5F-2 corresponds to FIG. 5F-1, but is a side view with an outer layer of a portion of the elongate shaft member 210 removed to more clearly see the illustrated embodiment of the reinforcement structure 280. In some embodiments, at least a first portion 280A of the reinforcement structure 280 surrounds at least a respective portion of each of the axial members (e.g., first axial member 250A and second axial member 250B). In some embodiments, at least a second portion 280B of the reinforcement structure 280 surrounds at least a respective portion of each of the first steering member 226 and the second steering member 228 (note that, in FIG. 5F-2, the second steering member 228 would be located on the rear side of the elongate shaft member 210 and, therefore, the second steering member 228 and the corresponding part of the second portion 280B of the reinforcement structure 280 is not visible in FIG. 5F-2). In some embodiments, the first portion 280A of the reinforcement structure 280 and the second portion 280B of the reinforcement structure 280 may be considered a same portion of the reinforcement structure. Reinforcement structure 280 may, according to some embodiments, be provided to reinforce the elongate shaft member 210 to maintain elements such as axial members 250 or steering members 226, 228 in desired positions within the elongate shaft member 210 during use thereof. In some embodiments, the reinforcement structure 280 may enhance bending stiffness of at least part of the elongate shaft member 210. In some embodiments, the reinforcement structure 280 may enhance torsional stiffness of at least part of the elongate shaft member 210. In some embodiments, the reinforcement structure 280 may help reduce the risk that the axial members (e.g., 250A and 250B) will rupture through the wall 204 of the elongate shaft member 210 in intense bending conditions of the elongate shaft member 210.

According to various embodiments, the reinforcement structure 280 may include one or more filaments or elements (e.g., metal filaments or polymer filaments). In the example embodiment of FIG. 5F-2, the reinforcement structure 280 includes filament 282A spiraling along a length of the elongate shaft member 210 in one direction and filament 282B spiraling in an opposing direction, according to some embodiments. In some embodiments, the reinforcement structure 280 includes a helical structure (e.g., one or more filaments (e.g., filaments 282A, 282B) helically wound around the longitudinal axis 230 of the elongate shaft member 210). In some embodiments, the reinforcement structure 280 includes a braided structure (e.g., multiple filaments (e.g., filaments 282A, 282B) braided around the longitudinal axis 230 of the elongate shaft member 210). In some embodiments, at least the first axial member (e.g., axial member 250A), at least the second axial member (e.g., axial member 250B), or each of at least the first axial member and the second axial member is woven among braids of the braided structure (for example, as shown in FIGS. 5F-1 and 5F-2). In some embodiments, at least the first steering member (e.g., steering member 226), at least the second steering member (e.g., steering member 228), or each of at least the first steering member and the second steering member is woven among braids of the braided structure.

Returning to characteristics of the axial members (e.g., axial members 250A, 250B) and at least FIG. 5C, a particular part (e.g., particular part 252A) of the first edge portion 252 exhibits a first radius of curvature (e.g., first radius of curvature R1) at a particular point (e.g., particular point 253A) on the first edge portion 252, and a particular part (e.g., particular part 254A) of the second edge portion 254 exhibits a second radius of curvature (e.g., second radius of curvature R2) at a particular point (e.g., particular point 255A) on the second edge portion 254. According to various embodiments, at least part (e.g., at least the particular part 252A) of the first edge portion 252 is located further from an inner-, interior-, or internal-most location 231 within the elongate shaft member 210 in a plane of the cross-section 256 of the axial member (e.g., 250A or 250B) than (a) the particular part (e.g., 254A) of the second edge portion 254 or (b) each part of the second edge portion 254, as shown, e.g., in at least FIG. 5C, where particular part 252A is outside of every part of second edge portion 254. Similarly, according to some embodiments, the particular point 253A on the first edge portion 252 is located further from the inner-, interior-, or internal-most location 231 within the elongate shaft member 210 in the plane of the cross-section 256 of the axial member (e.g., 250A or 250B) than the particular point 255A on the second edge portion 254. It is noted that a radius of curvature at a particular point on a curve is defined as the radius of a circle which best approximates a particular part of the curve located at that particular point. According to various embodiments, the second radius of curvature (e.g., R2) has a magnitude that is greater than a magnitude of the first radius of curvature (e.g., R1). According to some embodiments, these different radii of curvature may indicate, for example, that at least a region of an outer-, exterior-, or external-most surface of the axial member (e.g., axial member 250A or axial member 250B) has greater curvature than at least a region of an inner-, interior-, or internal-most surface of the axial member. Such a feature or configuration of the axial member, according to some embodiments, may, among other benefits, allow the axial member to be configured with some of the attributes of the desired second moment of area characteristics described above.

According to some embodiments, the magnitude of the second radius of curvature is a maximum as compared to a respective magnitude of each radius of curvature of every other part of the second edge portion 254. In some embodiments, with reference to FIG. 5C, the second radius of curvature R2 exhibited by particular part 254A of the second edge portion 254 is a maximum as compared to a respective magnitude of each radius of curvature of every other part of the second edge portion 254. In some embodiments, the particular part 254A may be the location of minimum curvature or concavity (e.g., concave toward an interior region or the inner-, interior-, or internal-most location 231 within the elongate shaft member 210) along the second edge portion 254, according to some embodiments. In some embodiments, multiple parts of the second edge portion 254 may exhibit the maximum radius of curvature exhibited by all parts of the second edge portion 254.

According to some embodiments, the magnitude of the first radius of curvature is a maximum as compared to a respective magnitude of each radius of curvature of every other part of the first edge portion 252. In some embodiments, with reference to FIG. 5C, the first radius of curvature R1 exhibited by particular part 252A of the first edge portion 252 is a maximum as compared to a respective magnitude of each radius of curvature of every other part of the first edge portion 252. In some embodiments, the particular part 252A may be the location of minimum curvature or concavity (e.g., concave toward an interior region or the inner-, interior-, or internal-most location 231 within the elongate shaft member 210) along the first edge portion 252, according to some embodiments. In some embodiments, multiple parts of the first edge portion 252 may exhibit the maximum radius of curvature exhibited by all parts of the first edge portion 252.

The above-discussed features pertaining to the particular parts 252A, 254A possibly each being a respective point of maximum radius of curvature or point of minimum curvature along respective edge portions 252, 254 may, in some embodiments, at least point to various regions such as the central regions including particular parts 252A, 254A of the first and second edge portions 252, 254 being relatively flat as compared to other parts of the first and second edge portions 252, 254. Such a configuration may enhance strength and bendability of the axial member (e.g., 250A or 250B) while reducing risk of puncturing of the wall 204 of the elongate shaft member 210, as compared to, e.g., having points or peaks in such central regions.

In some embodiments, the magnitude of the second radius of curvature R2 is a maximum as compared to a respective magnitude of each radius of curvature of every part of the first edge portion 252 (for example, as shown in FIG. 5C). Such a feature may, for example, at least point to the inner-, interior-, or internal-most surface of the axial member (e.g., 250A or 250B) having less curvature than the outer-, exterior-, or external-most surface of the axial member, according to some embodiments. In some embodiments, such features may provide some of the attributes of the desired second moment of area characteristics described above.

According to various embodiments, each of multiple parts of first edge portion 252 located at different particular points on the first edge portion 252 may have a different radius of curvature (i.e., indicating that the first edge portion 252 defines a curve having variable curvature along its length). For example, in some embodiments, with reference to FIG. 5C, the particular part of the first edge portion 252 may, in some embodiments, be provided by particular part 252B located at particular point 253B on the first edge portion 252, with particular part 252B having a first radius of curvature R3 having a magnitude that is greater than the magnitude of the radius of curvature R1 of the particular part 252A at particular point 253A on the first edge portion 252.

In some embodiments, each of multiple parts of second edge portion 254 located at different particular points on the second edge portion 254 may have a different radius of curvature (i.e., indicating that the second edge portion 254 defines a curve having variable curvature along its length).

For example, in some embodiments, with reference to FIG. 5C, a particular part 254A located at a particular point 255A located on the second edge portion 254 exhibits a radius of curvature R2 (which may be referred to as a 'second' radius of curvature in some contexts) that has a magnitude that is greater than a magnitude of the radius of curvature R4 exhibited by the particular part 254B at particular point 255B located on the second edge portion 254.

While some of the embodiments discussed above with respect to FIG. 5C pertain to either or both of the first edge portion 252 and second edge portion 254 having variable curvature, other embodiments have either or both of the first edge portion 252 and second edge portion 254 having constant or substantially constant curvature. For example, although FIG. 5C illustrates different radii of curvature R1, R3 (and different centers of curvature at points 270A, 270B) corresponding to different parts 252A, 252B of first edge portion 252, a majority or substantially all parts of the first edge portion 252, in some embodiments, may have a same radius of curvature (and same center of curvature), and, in some embodiments, a majority or substantially all parts of second edge portion 254 may have a same radius of curvature (and same center of curvature). For example, FIG. 5D illustrates a cross-section of axial member 250C that has a uniform or same radius of curvature (and center of curvature) across first edge portion 252-1 and a uniform or same radius of curvature (and center of curvature) along second edge portion 254-1, excluding side edge portions 259a, 259b, according to some embodiments. In some embodiments, a particular one of the first edge portion 252 and the second edge portion 254 may having constant or substantially constant curvature along at least 50 percent of a length of the particular one of the first edge portion 252 and the second edge portion 254. In some embodiments, a particular one of the first edge portion 252 and the second edge portion 254 may having constant or substantially constant curvature along at least 70 percent of a length of the particular one of the first edge portion 252 and the second edge portion 254. In some embodiments, a particular one of the first edge portion 252 and the second edge portion 254 may having constant or substantially constant curvature along at least 90 percent of a length of the particular one of the first edge portion 252 and the second edge portion 254.

The geometric relationships described herein for various embodiments may apply to other parts of the first edge portion 252 and the second edge portion 254 that are not specifically described in this disclosure. Although each of the particular parts (e.g., at least particular part 252A, particular part 252B, particular part 254A, and particular part 254B) from which a respective radius of curvature (e.g., at least radius R1, radius R3, radius R2, and radius R4, respectively, in the example of FIG. 5C) is determined are illustrated and described as approximating a point, such particular parts may respectively have greater lengths along their respective edge portions (e.g., at least edge first edge portion 252 in the case of particular parts 252A, 252B, and second edge portion 254 in the case of particular parts 254A, 254B in the example of FIG. 5C). According to some embodiments, each of the particular part (e.g., 252A or 252B) of the first edge portion 252 and the particular part (e.g., 254A or 254B) of the second edge portion 254 is concave toward the inner-, interior-, or internal-most location 231 within the elongate shaft member 210 in the plane of the cross-section 256 of the axial member (e.g., 250A or 250B), as shown, for example, at least with FIG. 5C.

In some embodiments, the particular part (e.g., 252A) of the first edge portion 252 is directly across the cross-section 256 of the axial member (e.g., 250A or 250B) from the particular part (e.g., 254A) of the second edge portion 254. In some embodiments, each of the particular point (e.g., 253A) on the first edge portion 252 and the particular point (e.g., 255A) on the second edge portion 254 is located on an axis (e.g., axis 235-1 in FIG. 5C) extending radially from the inner-, interior-, or internal-most location 231 within the elongate shaft member 210 in the plane of the cross-section 256 of the axial member (e.g., 250A or 250B). According to some embodiments, at least a particular part of the first edge portion 252 is located further from the inner-, interior-, or internal-most location 231 within the elongate shaft member 210 in the plane of the cross-section 256 of the axial member (e.g., 250A or 250B) than all of the second edge portion 254. For example, in at least FIG. 5C, whether the particular part of the first edge portion 252 is particular part 252A, particular part 252B, or some other particular part of the first edge portion 252, each of these particular parts of the first edge portion 252 is located further from the inner-, interior-, or internal-most location 231 within the elongate shaft member 210 in the plane of the cross-section 256 of the axial member (e.g., 250A or 250B) than all of the second edge portion 254. According to some embodiments, at least a particular part of the first edge portion 252 is located further from the inner-, interior-, or internal-most location 231 within the elongate shaft member 210 in the plane of the cross-section 256 of the axial member (e.g., 250A or 250B) than another part of the first edge portion 252.

According to some embodiments, the particular part 252A of the first edge portion 252 is a particular arcuate part of the first edge portion 252, and the particular part 254A of the second edge portion 254 is a particular arcuate part of the second edge portion 254. In some embodiments, a particular arcuate part of the first edge portion 252 at a particular point on the first edge portion 252 has a center of curvature located at a first particular location. For example, particular part 252A may, in some embodiments, be a particular arcuate part of the first edge portion 252 at the particular point 253A on the first edge portion 252 having a center of curvature located at a first particular location 270A. In some embodiments, a particular arcuate part of the second edge portion 254 at a particular point on the second edge portion 254 has a center of curvature located at a second particular location. For example, particular part 254A, may in some embodiments, be a particular arcuate part of the second edge portion 254 at the particular point 255A on the second edge portion 254 having a center of curvature located at a second particular location 272A. According to some embodiments, the second particular location is spaced from the first particular location. For example, in FIG. 5C, second particular location 272A is spaced from first particular location 270A. According to various embodiments, the center of curvature may be considered to be a particular location corresponding to the center of a circle which passes through a particular curved or arcuate part at a particular point, the circle having the same tangent and curvature as the particular curved or arcuate part at that particular point.

According to some embodiments, the particular arcuate part (e.g., 252A) of the first edge portion 252 is located further from an inner-, interior-, or internal-most location 231 within the elongate shaft member 210 in a plane of the cross-section 256 of the axial member (e.g., 250A or 250B) than the particular arcuate part (e.g., 254A) of the second edge portion 254. In some embodiments, each of the first particular location (e.g., 270A) and the second particular location (e.g., 272A) is located on a same side of the particular arcuate part (e.g., 254A) of the second edge portion 254 in the plane of the cross-section 256 of the axial member (e.g., 250A or 250B). For example, in FIG. 5C, each of the first particular location 270A and the second particular location 272A are both located inwardly from (more within the elongate shaft member 210 than) the particular arcuate part 254A of the second edge portion 254 in the plane of the cross-section 256 of the axial member (e.g., 250A or 250B) as per some embodiments.

According to some embodiments, the particular part of the second edge portion 254 is a particular linear or straight part of the second edge portion 254. For example, FIG. 5D includes cross-sections of various axial members 250C, 250D, 250E, 250F, 250G, and 250H that may be employed, according to other embodiments. In one particular example with respect to axial member 250H, the particular part 254C of the second edge portion 254 of the cross-section of axial member 250H is a linear or straight part, such that the second edge portion 254 of the cross-section of the axial member 250H is flat, according to some embodiments. In some embodiments, it is considered that a flat part like particular part 254C of axial member 250H exhibits a radius of curvature equal to infinity.

Figure 6:
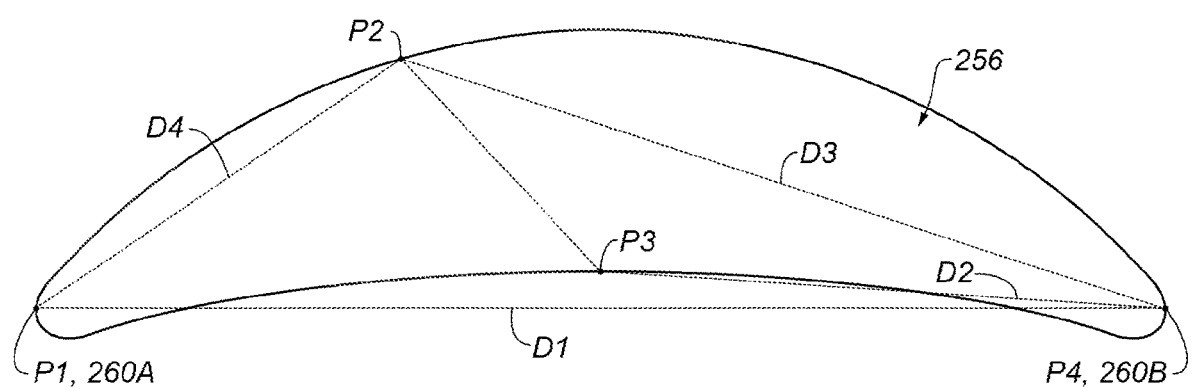
FIG. 6 is a cross-sectional view of an axial member that may be employed in an elongate shaft member of a medical system, the cross-sectional view illustrating some characteristics of the axial member, according to some embodiments.

In some embodiments, each of the first edge portion 252 and the second edge portion 254 extends to a particular pair of points (e.g., point 260A and point 260B in the example of FIG. 5C, with points 260A, 260B collectively referred to herein as points 260) on the outer, exterior, or external boundary 256A of the cross-section 256 of the axial member (e.g., 250A or 250B). In some embodiments, the particular pair of points, such as points 260, are intersected by a major axis X-X of the cross-section 256 of the axial member (e.g., 250A or 250B). In some embodiments, the major axis X-X is oriented with respect to the cross-section 256 of the axial member (e.g., 250A or 250B), such that a distance along the major axis X-X between the particular pair of points 260 on the outer, exterior, or external boundary 256A of the cross-section 256 of the axial member (e.g., 250A or 250B) has a maximum magnitude among all straight-line distances between all combinations of pairs of points along the outer, exterior, or external boundary 256A of the cross-section 256 of the axial member (e.g., 250A or 250B) (for example, as shown in FIG. 5C for the case of axial member 250B). In other words, in some embodiments, the pair of points 260 is the most-distant pair of points on the outer, exterior, or external boundary 256A of the cross-section 256 of the axial member (e.g., 250A or 250B). FIG. 6, which is an exploded view of the cross-section 256 of FIG. 5C, illustrates this maximum magnitude among all straight-line distances determination, according to some embodiments. For purposes of clarity, in the example of FIG. 6, only four points P1, P2, P3, and P4 are illustrated along the outer, exterior, or external boundary 256A of the cross-section 256 of the axial member 250B, in this example. Point P1 in FIG. 6 may correspond to point 260A in FIG. 5C, and point P4 in FIG. 6 may correspond to point 260B in FIG. 5C. Also, the cross-section 256 of the axial member 250B is shown rotated 90 degrees in FIG. 6, as compared to FIG. 5C, for example, merely for convenience. In the example of FIG. 6, straight-line distances D1, D2, D3, and D4 are illustrated in broken lines between each of the illustrated four points P1, P2, P3, and P4. In this regard, it can be seen that distance D1 between point P1 (e.g., which may correspond to point 260A in FIG. 5C) and point P4 (e.g., which may correspond to point 260B in FIG. 5C) has the maximum magnitude among all straight-line distances D2, D3, and D4 between all other pairs of points P3, P4; P2, P4; and P1, P2, respectively. Accordingly, the major axis X-X from FIG. 5C lies along the straight-line distance D1 in FIG. 6, according to some embodiments.

Returning to FIG. 5C, according to various embodiments, each point (e.g., 260A, 260B) of the particular pair of points 260 on the outer, exterior, or external boundary 256A of the cross-section 256 of the axial member (e.g., 250A or 250B) is closer to the inner, interior, or internal edge 205B of the closed shape of the tubular layer 205 than to the outer, exterior, or external edge 205A of the closed shape of the tubular layer 205 in the plane of the cross-section 256 of the axial member.

According to some embodiments, each point (e.g., 260A, 260B) of the particular pair of points 260 on the outer, exterior, or external boundary 256A of the cross-section 256 of the axial member (e.g., 250A or 250B) is closer to an edge 211A of a closed shape of the lumen 211 in the plane of the cross-section 256 of the axial member than to an edge of an outer, exterior, or external surface 216 (e.g., formed at least in part by outer, exterior, or external edge 216A) of the elongate shaft member 210 in the plane of the cross-section 256 of the axial member.

According to some embodiments, (a) the first edge portion 252 of the cross-section 256 of the axial member (e.g., 250A or 250B, FIG. 5C) extends along an arcuate path from one point (e.g., 260A) of the particular pair of points 260 on the outer, exterior, or external boundary 256A of the cross-section 256 of the axial member to the other point (e.g., 260B) of the particular pair of points 260 on the outer, exterior, or external boundary 256A of the cross-section 256 of the axial member, (b) the second edge portion 254 of the cross-section 256 of the axial member extends along an arcuate path from the one point (e.g., 260A) of the particular pair of points 260 on the outer, exterior, or external boundary 256A of the cross-section 256 of the axial member to the other point (e.g., 260B) of the particular pair of points 260 on the outer, exterior, or external boundary 256A of the cross-section 256 of the axial member, or both (a) and (b). Such arcuate path(s) may help the axial member (e.g., 250A or 250B) provide some of the attributes of the desired second moment of area characteristics described above. In various embodiments, various portions of the arcuate path may have different curvatures.

Figure 5H:
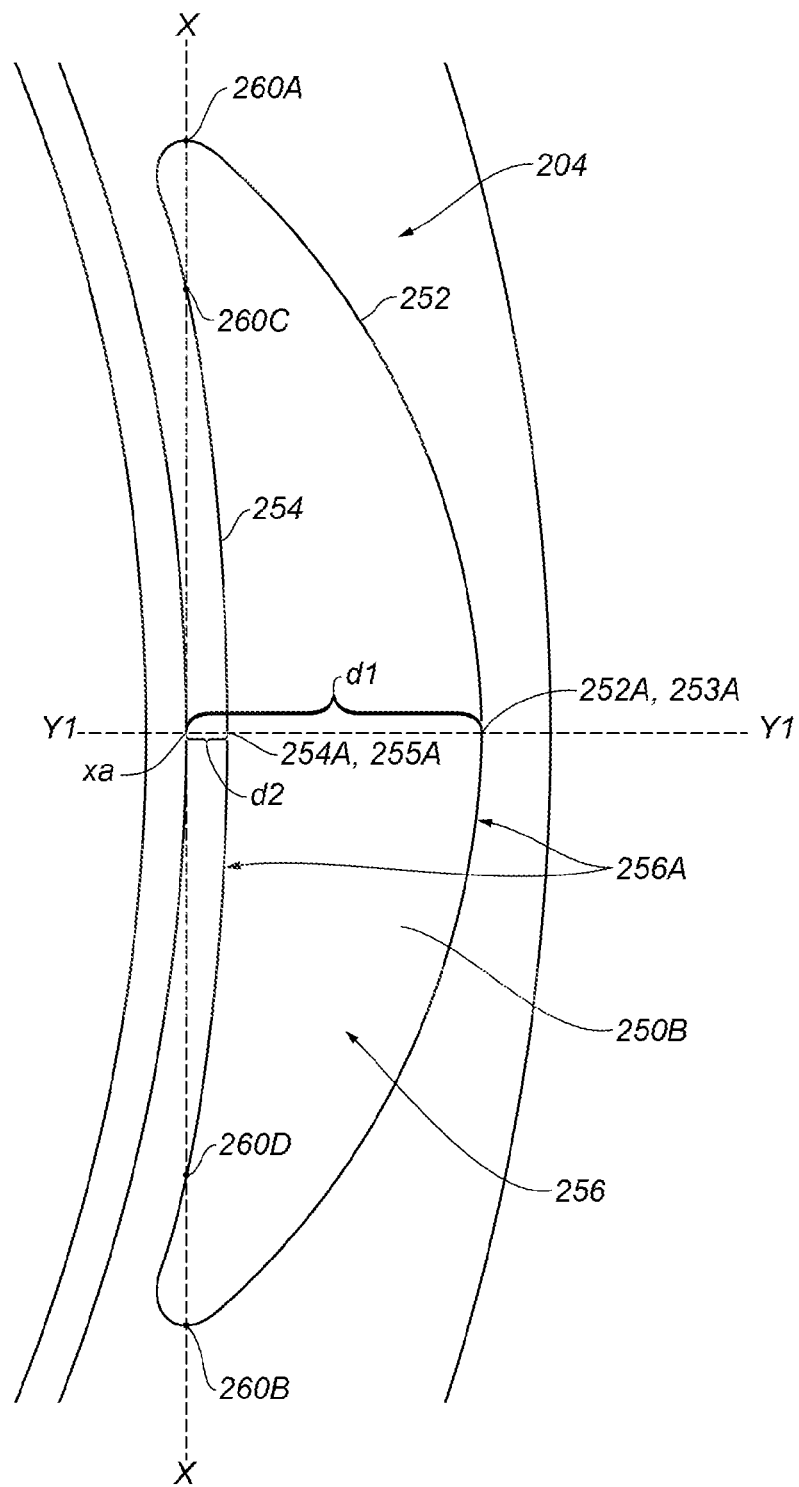
FIG. 5H is a cross-sectional view of an elongate shaft member of a medical system, the cross-sectional view including a cross-section of an axial member of the elongate shaft member, and the cross-sectional view illustrating some characteristics of the axial member, according to some embodiments.
Figure 5I:
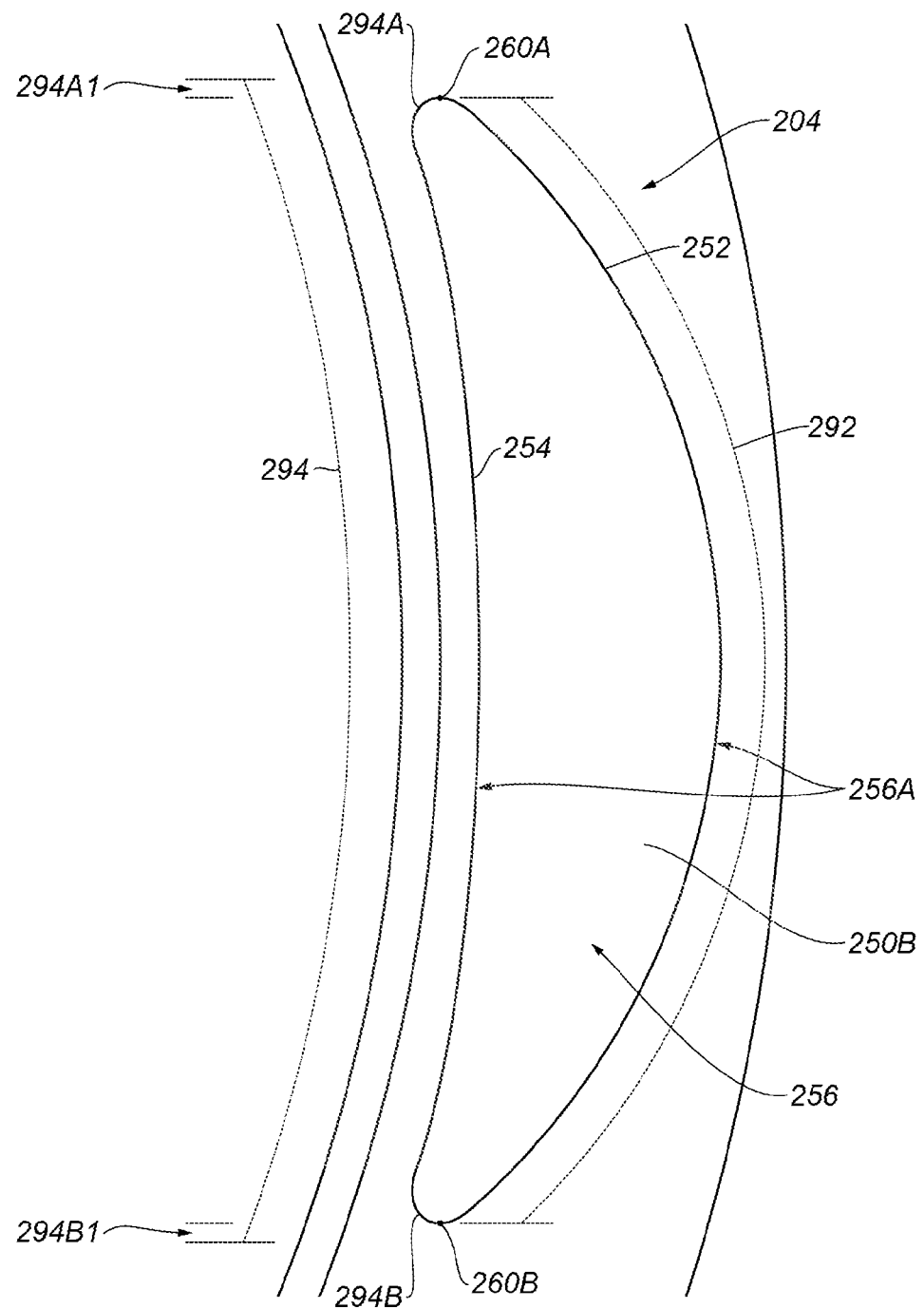
FIG. 5I is a cross-sectional view of an elongate shaft member of a medical system, the cross-sectional view including a cross-section of an axial member of the elongate shaft member, and the cross-sectional view illustrating some characteristics of the axial member, according to some embodiments.

In some embodiments, with respect to FIG. 5I, which is a detailed view of the cross-section 256 of FIG. 5C, a first distance 292 extending along the first edge portion 252 of the cross-section 256 of the axial member (e.g., 250A or 250B, but 250B in the example of FIG. 5I) from one point (e.g., 260A) of the particular pair of points 260 on the outer, exterior, or external boundary 256A of the cross-section 256 of the axial member to the other point (e.g., 260B) of the particular pair of points 260 on the outer, exterior, or external boundary 256A of the cross-section 256 of the axial member is different than a second distance 294 extending along the second edge portion 254 of the cross-section 256 of the axial member from the one point (e.g., 260A) of the particular pair of points 260 on the outer, exterior, or external boundary 256A of the cross-section 256 of the axial member to the other point (e.g., 260B) of the particular pair of points on the outer, exterior, or external boundary 256A of the cross-section 256 of the axial member. In the example of FIG. 5I, the second distance 294 is shown as extending beyond the particular pair of points 260A, 260B, because the second distance 294 is representative of a distance along the second edge portion 254, according to some embodiments. In this regard, since the second edge portion 254, at least in the example embodiment of FIG. 5I, includes turning portions 294A, 294B, such turning portions 294A, 294B are accounted for in extension portions 294A1, 294B1 of the second distance 294. Although FIG. 5I does not represent extension portions for first distance 292, a small amount of such extension portions may exist in some embodiments, but are not shown in FIG. 5I merely for purposes of clarity.

In some embodiments, the first distance 292 is greater than the second distance 294. In the example of FIG. 5I, although the first distance 292 may appear, at first glance, to be shorter than second distance 294 due to the increased curvature of first distance 292 as compared to second distance 294, if both distances 292, 294 are straightened into straight lines, it would be clear that first distance 292 is longer than second distance 294. In this regard, in some embodiments, a longer first distance 292 as compared to the second distance 294 may indicate increased curvature of the first edge portion 252 as compared to the second edge portion 254, which, according to some embodiments, may, among other benefits, allow the axial member (e.g., 250A or 250B) to provide sufficient supporting strength to the elongate shaft member 210, while not increasing a required thickness of the wall 204 of the elongate shaft member 210.

According to some embodiments, a particular location (e.g., 253A) on the first edge portion 252 and a particular location (e.g., 255A) on the second edge portion 254 are located on a same side (e.g., outermost side in the example of FIG. 5C) of the major axis X-X in the plane of the cross-section 256 of the axial member (e.g., 250A or 250B), the particular locations being from which the above-discussed radii of curvatures (e.g., radius of curvature R1 and radius of curvature R2) are determined. Such a feature may point to a relatively large degree of curvature of the axial member (e.g., 250A or 250B) which, among other benefits, may provide some of the attributes of the desired second moment of area characteristics described above, according to some embodiments. In some embodiments, the particular location on the first edge portion 252 and the particular location on the second edge portion 254 are located on opposite sides of the major axis X-X in the plane of the cross-section 256 of the axial member (e.g., 250A or 250B). For example, in FIG. 5D, the particular part 252C is located at the particular location 253C on the first edge portion 252 of the cross-section of the axial member 250H, and particular part 254C is located at the particular location 255C on the second edge portion 254 of cross-section 256 of the axial member 250H, the particular location 253C located on an opposite side of the major axis X-X from the particular location 255C in the plane of the cross-section of the axial member. Such a feature may point to a relatively increased flatness or a more convex shape of an inner-, interior-, or internal-most surface (e.g., including second edge portion 254) of the axial member, with respect to the outer-, exterior-, or external-most surface (e.g., including first edge portion 252) which, among other benefits, may provide some of the attributes of the desired second moment of area characteristics described above.

According to some embodiments, the major axis X-X does not intersect the outer, exterior, or external boundary 256A of the cross-section 256 of the axial member (e.g., 250A or 250B) at any location on the outer, exterior, or external boundary 256A other than at each point of the particular pair of points 260 on the outer, exterior, or external boundary 256A of the cross-section 256 of the axial member. For example, as shown in the cross-section of axial member 250H shown in FIG. 5D, at least due to the flatness of part of the second edge portion 254 of the cross-section of such axial member 250H, the major axis X-X does not intersect the outer, exterior, or external boundary 256A except at the points 260A, 260B. On the other hand, according to some embodiments, the major axis X-X intersects the outer, exterior, or external boundary 256A of the cross-section 256 of the axial member (e.g., 250A or 250B) at one or more locations on the outer, exterior, or external boundary 256A in addition to each point of the particular pair of points 260 on the outer, exterior, or external boundary 256A of the cross-section 256 of the axial member. For example, as shown in at least FIG. 5H, due to the relative concavity (e.g., toward the inner-, interior-, or internal-most location within the elongate shaft member 210) of the second edge portion 254, the major axis X-X not only intersects the external boundary 256A of the cross-section 256 of the axial member 250B at points 260A, 260B, but also at points 260C, 260D. Accordingly, in some embodiments, whether or not the major axis intersects the external boundary 256A of the cross-section 256 of the axial member (e.g., 250A, 250B) at two or more points may depend on the relative degree of curvature(s) exhibited by one or more portions of the external boundary 256A. For another example, FIG. 5D shows an embodiment of a cross-section 256 of an axial member 250I, where a notch 258 is formed in the second edge portion 254 of the cross-section, where such second edge portion 254 is otherwise flat absent the notch 258, but may be convex or concave in other embodiments. Other embodiments may have multiple such notches 258 in the cross-section of the axial member. Each such notch 258 may provide a path through which one or more catheter elements, such as control lines, power lines, or fluid conduits, may pass. As illustrated in FIG. 5D, axial member 250I, the major axis X-X not only intersects the external boundary 256A of the cross-section 256 of the axial member 250I at points 260A, 260B, but also at points 260E, 260F due to the notch 258.

In some embodiments, the cross-section 256 of the axial member (e.g., 250A or 250B) includes a minor axis intersecting the major axis X-X at a particular location on the major axis X-X. The minor axis may be perpendicular to the major axis X-X, according to some embodiments. In the example of FIG. 5H, which illustrates a slightly different shape of the axial member 250B compared to at least the shape of the axial member 250B in FIG. 5C, according to some embodiments, such a minor axis is illustrated as minor axis Y1-Y1, which is perpendicular to the major axis X-X and which intersects the major axis X-X at particular location xa on the major axis X-X. It is noted, however, that many different minor axes may intersect the major axis X-X at respective particular locations, and different ones of these minor axes may be associated with different embodiments. For example, FIG. 5C illustrates another minor axis as line Y2-Y2, which is perpendicular to the major axis X-X and which intersects the major axis X-X at particular location xb on the major axis X-X, according to some embodiments. Returning again to the minor axis Y1-Y1 in FIG. 5H, according to various embodiments, the first edge portion 252 is intersected by the minor axis Y1-Y1 at the particular point 253A on the first edge portion 252, and the second edge portion 254 is intersected by the minor axis Y1-Y1 at the particular point 255A on the second edge portion 254. By way of another example with respect to the minor axis Y2-Y2 in FIG. 5C, the first edge portion 252 is intersected by the minor axis Y2-Y2 at the particular point 253B on the first edge portion 252, and the second edge portion 254 is intersected by the minor axis Y2-Y2 at the particular point 255B on the second edge portion 254, according to some embodiments.

According to some embodiments, the particular location on the major axis X-X intersected by the minor axis is halfway between the particular pair of points 260 (for example, particular location xa with respect to minor axis Y1-Y1 in FIG. 5H). According to some embodiments, a first distance between (a) the particular location on the major axis X-X intersected by the minor axis, and (b) the particular point on the first edge portion 252 of the cross-section 256 of the axial member (e.g., 250A or 250B) is different than a second distance between (c) the particular location on the major axis X-X, and (d) the particular point on the second edge portion 254 of the cross-section 256 of the axial member (e.g., 250A or 250B). For example, in FIG. 5H, which illustrates an embodiment of the cross-section 256 of an axial member, which may be an embodiment of axial member 250A or 250B, a first distance d1 between the particular location xa (on the major axis X-X is intersected by the minor axis Y1-Y1) and the particular point 253A on the first edge portion 252 of the cross-section 256 of the axial member (e.g., 250A or 250B, but 250B in the example of FIG. 5H) is different than a second distance d2 between the particular location xa on the major axis X-X and the particular point 255A on the second edge portion 254 of the cross-section 256 of the axial member (e.g., 250A or 250B, but 250B in the example of FIG. 5H). In this regard, for example, the particular point 253A on the first edge portion 252 also may be considered a first location on the minor axis Y1-Y1 intersected by the first edge portion 252, and the particular point 255A on the second edge portion 254 also may be considered a second location on the minor axis Y1-Y1 intersected by the second edge portion 254, according to some embodiments. In some embodiments, the first distance is greater than the second distance, as is the case of first distance d1 being greater than the second distance d2 in the example of FIG. 5H.

According to some embodiments, the first edge portion 252 of the cross-section 256 of the axial member (e.g., 250A or 250B) is symmetrical about the minor axis of the cross-section 256 of the axial member (e.g., 250A or 250B). For example, with respect to at least the examples of FIGS. 5C and 5H, the first edge portion 252 of the cross-section 256 of the axial member (e.g., 250A or 250B, but 250B in the examples of at least FIGS. 5C and 5H) is symmetrical about the minor axis Y1-Y1 of the cross-section 256 of the axial member, according to some embodiments. According to some embodiments, the second edge portion 254 of the cross-section 256 of the axial member (e.g., 250A or 250B) is symmetrical about the minor axis of the cross-section 256 of the axial member (e.g., 250A or 250B). For example, with respect to at least the examples of FIGS. 5C and 5H, the second edge portion 254 of the cross-section 256 of the axial member (e.g., 250A or 250B, but 250B in the examples of at least FIGS. 5C and 5H) is symmetrical about the minor axis Y1-Y1 of the cross-section 256 of the axial member, according to some embodiments.

According to some embodiments, each of the first particular location (e.g., 270A) and the second particular location (e.g., 272A) are center of curvature locations located on a same side of the major axis X-X in the plane of the cross-section 256 of the axial member (e.g., 250A or 250B). For example, in FIG. 5C, each of the first particular location 270A and the second particular location 272A are both located inwardly from (more within the elongate shaft member 210 than) the major axis X-X as per some embodiments. According to some embodiments, (a) the first particular location, (b) the second particular location, or each of (a) and (b) is located on the minor axis. For example, in FIG. 5C, each of the first particular location 270A and the second particular location 272A are located on minor axis Y1-Y1.

In some embodiments, (a) the first particular location, (b) the second particular location, or each of (a) and (b) is not located on the minor axis. For example, in FIG. 5C, first edge portion 252 is intersected by minor axis Y2-Y2 at particular point 253B on first edge portion 252, according to some embodiments. Particular part 252B may, in some embodiments, be a particular arcuate part of the first edge portion 252 at the particular point 253B on the first edge portion 252 having a center of curvature located at a first particular location 270B. In FIG. 5C, second edge portion 254 is intersected by minor axis Y2-Y2 at particular point 255B on second edge portion 254, according to some embodiments. Particular part 254B, may in some embodiments, be a particular arcuate part 254B of the second edge portion 254 at the particular point 255B on the second edge portion 254 having a center of curvature located at a second particular location 272B. In at least these particular embodiments, neither first particular location 270B nor second particular location 272B are on the minor axis Y2-Y2. It is noted that particular arcuate part 254B has a radius of curvature indicated as R4 in FIG. 5C.

In some embodiments, (a) the first particular location and the particular point on the first edge portion 252 are intersected by a first axis, and (b) the second particular location and the particular point on the second edge portion 254 are intersected by a second axis which is not parallel to the first axis. In FIG. 5C, in the case of minor axis Y2-Y2, for example, first particular location 270B and the particular point 253B on the first edge portion 252 are intersected by a first axis a-a, and second particular location 272B and the particular point 255B are intersected by a second axis b-b which is not parallel to the first axis a-a, according to some embodiments. In some embodiments, each of the first axis (e.g., first axis a-a) and the second axis (e.g., second axis b-b) is not parallel to the minor axis (e.g., minor axis Y2-Y2).

The feature of the second axis being non-parallel with the first axis may indicate, for example, that the respective curvatures of the first and second edge portions 252, 254 at the respective particular points 253B, 255B face different locations (e.g., have different centers of curvature), which may indicate a convergence or divergence of the respective regions of the first and second edge portions 252, 254, according to some embodiments. Such convergence or divergence may indicate that the respective axial member (e.g., 250A, 250B) has a non-flat shape, which may, according to some embodiments, provide some of the attributes of the desired second moment of area characteristics described above. For example, a convergence of the first and second edge portions 252, 254 may indicate a tapered or bent shape of the axial member, such tapered or bent shape may provide some of the attributes of the desired second moment of area characteristics described above, according to some embodiments.

In some embodiments, (a) the first particular location and the particular point on the first edge portion are intersected by a first axis, and (b) the second particular location and the particular point on the second edge portion are intersected by a second axis parallel to the first axis. For example, in FIG. 5C, first particular location 270A and the particular point 253A on the first edge portion 252 are intersected by a first axis (e.g., axis Y1-Y1) and second particular location 272A and the particular point 255A are intersected by a second axis (e.g., which may also be axis Y1-Y1), which is parallel to (i.e., co-linear with, in this example) the first axis, according to some embodiments. In some embodiments, each of the first axis and the second axis is parallel to or co-linear with the minor axis (e.g., minor axis Y1-Y1). In some embodiments, as shown in FIG. 5C, a line segment from point 253A to point 255A along minor axis Y1-Y1 represents a region of maximum thickness of the axial member (axial member 250B in the example of FIG. 5C).

It is noted that axial members such as those described above need not be strengthening members in other embodiments. For example, in some embodiments, the axial member is a steering member operatively coupling the steerable portion 219 to an actuator (e.g., actuator device system 240), the actuator configured to manipulate the steering member (i.e., the axial member) to cause bending or deflection of the at least the steerable portion 219 in a particular plane. For example, in FIG. 5G, two axial members 226C and 228C are incorporated in the elongate shaft member 210 (i.e., shown in cross-section), the two axial members 226C and 228C configured as steering members functioning as described above. The use of axial members with geometric properties described above as steering members may be motivated for different reasons. For example, such steering members may have a relatively low second moment of area Ix (e.g., as per the discussion above related to FIG. 5B) to allow for bending or deflection of at least the steerable portion 219 in a particular plane (e.g., represented by line 235) while having a relatively high second moment of area Iy (e.g., as per the discussion above related to FIG. 5B) to resist lateral bending or deflection in a plane (e.g., represented by line 237) of the at least the steerable portion 219 during the bending thereof. In some embodiments, rather than being embedded in the elongate shaft member 210, at least a portion of the axial member (e.g., 226C or 228C, FIG. 5G) is positioned in a lumen provided in the elongate shaft member 210, the axial member operatively coupled to the elongate shaft member 210 such that relative translation between the lumen and the at least the portion of the axial member (e.g., 226C or 228C) provided in the lumen occurs during the steering of the at least the steerable portion 219.

While some of the embodiments disclosed above are described with examples of cardiac procedures, the same or similar embodiments may be used for procedures for other bodily organs or any lumen or cavity into which the devices of the present invention may be introduced.

Subsets or combinations of various embodiments described above provide further embodiments.

These and other variations can be made in light of the above-detailed description. In general, in the following claims, the terms used should not be construed to limit the invention to the specific embodiments disclosed in the specification and the claims, but should be construed to include other catheter-based device systems including all medical treatment device systems and medical diagnostic device systems in accordance with the claims. Accordingly, the invention is not limited by the disclosure, but instead its scope is to be determined entirely by the following claims.

What is claimed is:

1. A steerable catheter comprising:
   an elongate shaft member comprising a proximal portion, a distal portion, and a steerable portion between the proximal portion and the distal portion, the elongate shaft member configured to be deliverable at least partially through a bodily opening leading to a bodily cavity with the distal portion ahead of the proximal portion;
   an actuator located at least proximate the proximal portion, the actuator operatively coupled to the steerable portion to transmit force thereto to steer at least the steerable portion; and
   an axial member incorporated in the elongate shaft member and extending along a length of the elongate shaft member, the axial member including an axis extending between the proximal portion of the elongate shaft member and the distal portion of the elongate shaft member,
   wherein, at a particular location along the axis of the axial member, a cross-section of the axial member comprises a first edge portion and a second edge portion located on an opposite side of the cross-section of the axial member from the first edge portion, the first edge portion and the second edge portion defining an external boundary of the cross-section of the axial member, the cross-section of the axial member perpendicular to the axis of the axial member, and
   wherein, a particular part of the first edge portion exhibits a first radius of curvature at a particular point on the first edge portion, and a particular part of the second edge portion exhibits a second radius of curvature at a particular point on the second edge portion, the second radius of curvature having a magnitude that is greater than a magnitude of the first radius of curvature, the particular part of the first edge portion located further from an interior-most location within the elongate shaft member in a plane of the cross-section of the axial member than the particular part of the second edge portion.

2. The steerable catheter of claim 1, wherein each of the particular point on the first edge portion and the particular point on the second edge portion is located on an axis extending radially from the interior-most location within the elongate shaft member in the plane of the cross-section of the axial member.

3. The steerable catheter of claim 1,
   wherein each of the first edge portion and the second edge portion extends to a particular pair of points on the external boundary of the cross-section of the axial member intersected by a major axis of the cross-section of the axial member, the major axis oriented with respect to the cross-section of the axial member such that a distance along the major axis between the particular pair of points on the external boundary of the cross-section of the axial member has a maximum magnitude among all straight-line distances between all combinations of pairs of points along the external boundary of the cross-section of the axial member,
   wherein the cross-section of the axial member comprises a minor axis intersecting the major axis at a particular location on the major axis, the minor axis perpendicular to the major axis,
   wherein the first edge portion is intersected by the minor axis at the particular point on the first edge portion, and
   wherein the second edge portion is intersected by the minor axis at the particular point on the second edge portion.

4. The steerable catheter of claim 3, wherein the particular location on the major axis is halfway between the particular pair of points on the external boundary of the cross-section of the axial member.

5. The steerable catheter of claim 3, wherein the first edge portion of the cross-section of the axial member is symmetrical about the minor axis of the cross-section of the axial member.

6. The steerable catheter of claim 3, wherein the second edge portion of the cross-section of the axial member is symmetrical about the minor axis of the cross-section of the axial member.

7. The steerable catheter of claim 4, wherein a first distance between the particular location on the major axis and the particular point on the first edge portion of the cross-section of the axial member is different than a second distance between the particular location on the major axis and the particular point on the second edge portion of the cross-section of the axial member.

8. The steerable catheter of claim 7, wherein the first distance is greater than the second distance.

9. The steerable catheter of claim 1, wherein the particular part of the first edge portion is located further from the interior-most location within the elongate shaft member in the plane of the cross-section of the axial member than all of the second edge portion.

10. The steerable catheter of claim 1, wherein the magnitude of the second radius of curvature is a maximum as compared to a respective magnitude of each radius of curvature of every other part of the second edge portion.

11. The steerable catheter of claim 1, wherein the magnitude of the first radius of curvature is a maximum as compared to a respective magnitude of each radius of curvature of every other part of the first edge portion.

12. The steerable catheter of claim 1, wherein the magnitude of the second radius of curvature is a maximum as compared to a respective magnitude of each radius of curvature of every part of the first edge portion.

13. The steerable catheter of claim 1, wherein the particular part of the second edge portion is a particular arcuate part of the second edge portion, and the particular part of the first edge portion is a particular arcuate part of the first edge portion.

14. The steerable catheter of claim 1, wherein each of the particular part of the first edge portion and the particular part of the second edge portion is concave toward the interior-most location within the elongate shaft member in the plane of the cross-section of the axial member.

15. The steerable catheter of claim 3, wherein the particular location on the first edge portion and the particular location on the second edge portion are located on a same side of the major axis in the plane of the cross-section of the axial member.

16. The steerable catheter of claim 3, wherein the particular location on the first edge portion and the particular location on the second edge portion are located on opposite sides of the major axis in the plane of the cross-section of the axial member.

17. The steerable catheter of claim 1, wherein each of the first edge portion and the second edge portion extends to a particular pair of points on the external boundary of the cross-section of the axial member intersected by a major axis of the cross-section of the axial member, the major axis oriented with respect to the cross-section of the axial member such that a distance along the major axis between the particular pair of points on the external boundary of the cross-section of the axial member has a maximum magnitude among all straight-line distances between all combinations of pairs of points along the external boundary of the cross-section of the axial member.

18. The steerable catheter of claim 17, wherein (a) the first edge portion of the cross-section of the axial member extends along an arcuate path from one point of the particular pair of points on the external boundary of the cross-section of the axial member to the other point of the particular pair of points on the external boundary of the cross-section of the axial member, (b) the second edge portion of the cross-section of the axial member extends along an arcuate path from the one point of the particular pair of points on the external boundary of the cross-section of the axial member to the other point of the particular pair of points on the external boundary of the cross-section of the axial member, or both (a) and (b).

19. The steerable catheter of claim 17, wherein a first distance extending along the first edge portion of the cross-section of the axial member from one point of the particular pair of points on the external boundary of the cross-section of the axial member to the other point of the particular pair of points on the external boundary of the cross-section of the axial member is different than a second distance extending along the second edge portion of the cross-section of the axial member from the one point of the particular pair of points on the external boundary of the cross-section of the axial member to the other point of the particular pair of points on the external boundary of the cross-section of the axial member.

20. The steerable catheter of claim 17, wherein the major axis does not intersect the external boundary of the cross-section of the axial member at any location on the external boundary other than at each point of the particular pair of points on the external boundary of the cross-section of the axial member.

21. The steerable catheter of claim 17, wherein the major axis intersects the external boundary of the cross-section of the axial member at one or more locations on the external boundary in addition to each point of the particular pair of points on the external boundary of the cross-section of the axial member.

22. The steerable catheter of claim 1, wherein the elongate shaft member comprises a central longitudinal axis, and wherein the interior-most location within the elongate shaft member in the plane of the cross-section of the axial member is a location in the plane of the cross-section of the axial member intersected by the central longitudinal axis.

23. The steerable catheter of claim 1, wherein the interior-most location within the elongate shaft member in the plane of the cross-section of the axial member is a centroid of a cross-section of the elongate shaft member in the plane of the cross-section of the axial member.

24. The steerable catheter of claim 1, wherein the axial member is incorporated into a wall of a tubular member of the elongate shaft member, the tubular member forming a closed shape in a plane of a cross-section of the axial member, and wherein each of the first edge portion of the cross-section of the axial member and the second edge portion of the cross-section of the axial member is distanced, in the plane of the cross-section of the axial member, from each of (a) an external edge of the closed shape of the tubular member, and (b) an interior edge of the closed shape of the tubular member.

25. The steerable catheter of claim 24, wherein the external edge of the closed shape of the tubular member is distanced from an exterior surface of the elongate shaft member in the plane of the cross-section of the axial member.

26. The steerable catheter of claim 24, wherein the external edge of the closed shape of the tubular member is provided at least in part by an exterior surface of the elongate shaft member.

27. The steerable catheter of claim 1, wherein the axial member is embedded in the elongate shaft member to resist axial movement thereof.

28. The steerable catheter of claim 1, wherein the actuator is operatively coupled to the steerable portion to cause deflection of the at least the steerable portion in a first particular plane, and wherein the axial member is configured at least to resist, at least in part, lateral deflection of the at least the steerable portion away from the first particular plane during the deflection of the at least the steerable portion in the first particular plane.

29. The steerable catheter claim 1, wherein at least a portion of the axial member is positioned in a lumen provided in the elongate shaft member, the axial member operatively coupled to the elongate shaft member such that relative translation between the lumen and the at least the portion of the axial member provided in the lumen occurs during the steering of the at least the steerable portion.

30. The steerable catheter of claim 1, wherein the axial member is a steering member operatively coupling the steerable portion to the actuator, the actuator configured to manipulate the steering member to cause deflection of at least the steerable portion in a particular plane.

\* \* \* \* \*